US012743765B2

(12) United States Patent
Roy Chowdhury et al.

(10) Patent No.: US 12,743,765 B2
(45) Date of Patent: Sep. 22, 2026

(54) CLASSIFICATION OF DEFECT PATTERNS OF SUBSTRATES

(71) Applicant: Applied Materials, Inc., Santa Clara, CA (US)

(72) Inventors: Chandrani Roy Chowdhury, Belmont, CA (US); Sanjiv Mittal, Fremont, CA (US); James Henry Gardner, Jr., Santa Cruz, CA (US); Mohana Roy Chowdhury, Bangalore (IN); Sachin Dangayach, San Jose, CA (US); Victor Rotion D'souza, San Jose, CA (US); Rajesh Kumar Singal, Mountain House, CA (US); Rajesh Naidu Penagalapati, San Jose, CA (US); Priyanka Jain, Nagpur (IN)

(73) Assignee: Applied Materials, Inc., Santa Clara, CA (US)

( * ) Notice: Subject to any disclaimer, the term of this patent is extended or adjusted under 35 U.S.C. 154(b) by 727 days.

(21) Appl. No.: 17/976,726

(22) Filed: Oct. 28, 2022

(65) Prior Publication Data

US 2024/0144464 A1 May 2, 2024

(51) Int. Cl.
*G06T 7/00* (2017.01)
*G01N 21/88* (2006.01)
*G06V 10/764* (2022.01)

(52) U.S. Cl.
CPC ....... *G06T 7/0008* (2013.01); *G01N 21/8851* (2013.01); *G06V 10/764* (2022.01);
(Continued)

(58) Field of Classification Search
CPC ......... G06T 7/0008; G06T 2207/20081; G06T 7/0004; G01N 21/8851; G01N 2021/8861;
(Continued)

(56) References Cited

U.S. PATENT DOCUMENTS 6,480,627 B1 11/2002 Mathias
6,763,130 B1 7/2004 Somekh et al.
(Continued)

FOREIGN PATENT DOCUMENTS

KR 20160076310 A 6/2016
WO 2021052918 A1 3/2021

OTHER PUBLICATIONS

Shinde Prashant P.,et al., "Wafer defect localization and classification using deep learning techniques". IEEE Access. Apr. 11, 2022; 10:39969-74.*
(Continued)

*Primary Examiner* — Samir A Ahmed
(74) *Attorney, Agent, or Firm* — Lowenstein Sandler LLP

(57) ABSTRACT

A method includes obtaining, by a processing device, data indicative of locations of defects of a substrate. The method further includes generating an image indicating the locations of the defects. The method further includes providing the image indicating the locations of the defects to a trained machine learning model. The method further includes obtaining, as output from the trained machine learning model, a classification of the locations of the defects. The method further includes performing a corrective action in view of the output from the trained machine learning model.

18 Claims, 7 Drawing Sheets

(52) U.S. Cl.
CPC ................ *G01N 2021/8861* (2013.01); *G06T 2207/20081* (2013.01)

(58) Field of Classification Search
CPC ......... G01N 2021/8883; G06V 10/764; G06V 10/82
See application file for complete search history.

(56) References Cited

U.S. PATENT DOCUMENTS

| | | | | |
|---|---|---|---|---|
| 7,646,476 | B2 | 1/2010 | Huet | |
| 9,607,233 | B2 * | 3/2017 | Kaizerman | G06V 10/774 |
| 2008/0074659 | A1 | 3/2008 | Mangan et al. | |
| 2019/0188840 | A1 * | 6/2019 | Kwon | G06V 10/764 |
| 2020/0143528 | A1 * | 5/2020 | Kulkarni | G06N 20/00 |
| 2020/0209761 | A1 | 7/2020 | Liebregts et al. | |
| 2020/0226742 | A1 | 7/2020 | Sawlani | |
| 2021/0397170 | A1 * | 12/2021 | Zhou | H01L 22/20 |
| 2022/0044391 | A1 * | 2/2022 | Wallingford | G06N 3/047 |
| 2023/0054119 | A1 * | 2/2023 | Pai | G06T 7/001 |

OTHER PUBLICATIONS

Dewangan S, et al., "Image smoothening and sharpening using frequency domain filtering technique". International Journal of Emerging Technologies in Engineering Research Apr. 2017; vol. 5(Issue 4):169-74.*

International Search Report and Written Opinion for International Application No. PCT/US2023/077803, mailed Feb. 20, 2024, 9 Pages.

"Classify Defects on Wafer Maps Using Deep Learning," 13 pgs., MathWorks, https://www.mathworks.com/help/images/classify-anomalies-on-wafer-defect-maps-using-deep-learning.html, accessed Oct. 28, 2022.

* cited by examiner

CLASSIFICATION OF DEFECT PATTERNS OF SUBSTRATES

TECHNICAL FIELD

The instant specification relates to classification of substrates. Specifically, the instant specification relates to classification of substrates based on defect patterns of the substrates.

BACKGROUND

Chambers are used in many types of processing systems. Examples of chambers include etch chambers, deposition chambers, anneal chambers, and the like. Typically, a substrate, such as a semiconductor wafer, is placed on a substrate support within the chamber and conditions in the chamber are set and maintained to process the substrate. After processing, substrates may be inspected for defects. Multiple defects may form a pattern on a substrate, indicative of one or more deficiencies of the processing equipment.

SUMMARY

The following is a simplified summary of the disclosure in order to provide a basic understanding of some aspects of the disclosure. This summary is not an extensive overview of the disclosure. It is intended to neither identify key or critical elements of the disclosure, nor delineate any scope of the particular implementations of the disclosure or any scope of the claims. Its sole purpose is to present some concepts of the disclosure in a simplified form as a prelude to the more detailed description that is presented later.

In some aspects of the present disclosure, a method includes obtaining, by a processing device, data indicative of locations of defects of a substrate. The method further includes generating an image indicating the locations of the defects. The method further includes providing the image indicating the locations of the defects to a trained machine learning model. The method further includes obtaining, as output from the trained machine learning model, a classification of the locations of the defects. The method further includes performing a corrective action in view of the output from the trained machine learning model.

In some aspects of the disclosure, a method includes providing, as training input to a machine learning model, a first plurality of images. Each image includes an image of a substrate. The first plurality of images indicates locations of defects of the substrates. The method further includes providing, as target output to the machine learning model, a first plurality of classifications, wherein each classification is associated with a substrate and with a pattern of defects of the substrates. The method further includes training the machine learning model to generate a trained machine learning model.

In another aspect of the disclosure, a non-transitory machine-readable storage medium stores instructions which, when executed, cause a processing device to perform operations. The operations include obtaining, by a processing device, data indicative of locations of defects of a substrate. The operations further include generating an image indicating the locations of the defects. The operations further include providing the image indicating the locations of the defects to a trained machine learning model. The operations further include obtaining, as output from the trained machine learning model, a classification of the locations of the defects. The operations further include performing a corrective action in view of the output from the trained machine learning model.

BRIEF DESCRIPTION OF THE DRAWINGS

The present disclosure is illustrated by way of example, and not by way of limitation in the figures of the accompanying drawings.

DETAILED DESCRIPTION

Figure 1:
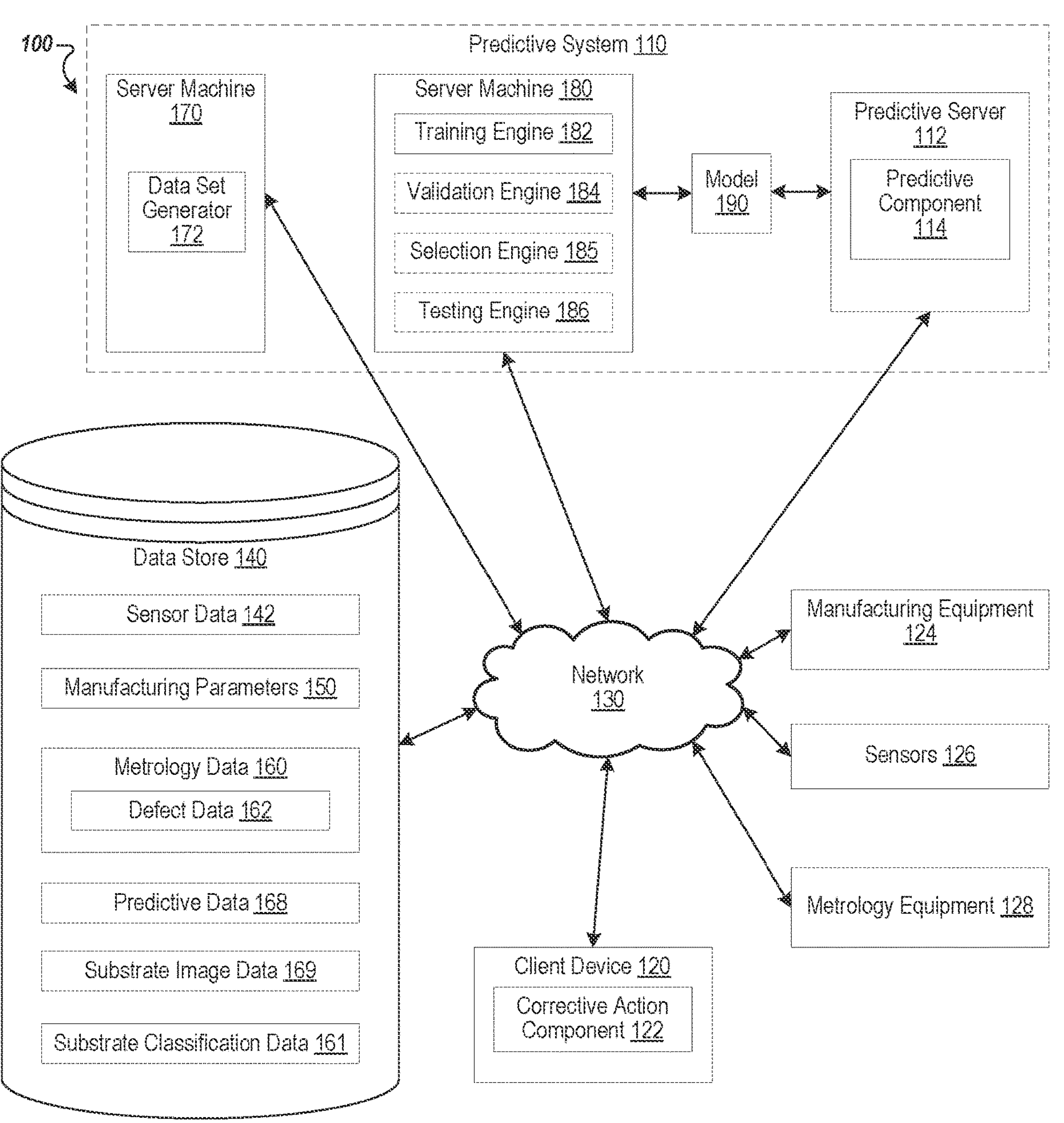
FIG. 1 is a block diagram illustrating an exemplary system (exemplary system architecture), according to some embodiments.

Described herein are technologies, methods, systems, and devices related to classification of patterns, such as defect patterns of substrates. In some embodiments, data indicative of the locations of defects of a substrate is received. The data may include location information derived from an inspection tool, such as a defect inspection tool. The data may include a list of locations of defects of a substrate, such as coordinate positions of the locations. The data may be an image of the substrate. The image may be generated from data produced by a defect inspection tool. Data may be standardized, e.g., reformatted for analysis. A map of defect locations may be generated. Data indicative of defect locations may be provided to a trained machine learning model as input. The trained machine learning model may generate, as output, a classification of a pattern of defects of the substrate. The classification may be used in performance of a corrective action.

Manufacturing equipment is used to produce substrates, such as semiconductor wafers. The properties of these substrates are determined by the conditions in which the substrates were processed. Accurate knowledge of property values in the manufacturing chamber during operation, especially in the immediate vicinity of the substrate, can be used to predict the properties of finished products, consistently produce substrates with the same properties, and tailor processing parameters to optimize substrate production.

Processing conditions that are not optimized for substrate generation may produce substrates exhibiting undesirable qualities. Substrate performance may be impacted, substrate metrology including physical, optical, chemical, and electrical properties may be impacted, etc. Updating future processes to achieve more ideal conditions for substrate processing may improve efficiency of a substrate processing system.

In some cases, the type of defects exhibited by one or more substrates may provide insight into process updates that may improve a processing procedure. For example, substrates with particle defects may indicate that one or more components of a process chamber are becoming worn, and performance may improve if these components are replaced.

In some cases, a pattern of defects across a substrate may indicate a process update that may improve performance of a processing procedure. A particular pattern of defects of a substrate may indicate that a transfer robot is working incorrectly, another pattern may indicate that a radio frequency (RF) plasma generation device is not optimized, etc.

A library may exist that correlates patterns of defects on a substrate to possible causes, possible corrective actions, appropriate maintenance to perform, or the like. The library may be generated by one or more subject matter experts. The library may be generated by a processing device, e.g., correlations between metrology of substrates and maintenance performed on a chamber may be discovered and utilized to generate the library.

In conventional systems, locations of defects of a substrate may be visualized. A user (e.g., a subject matter expert) may be presented with an image visualizing locations of defects of the substrate. The user may classify a pattern of the defects. The classification may be used to diagnose a deficiency in a manufacturing system, to recommend a corrective action, or the like. A subject matter expert-based classification system may be expensive in terms of time invested into classification tasks by personnel, time and money to train users to a sufficient level to classify defect patterns reliably, etc. Relying on a user to classify a defect pattern may cause inconsistent and/or incorrect classification. Inconsistent classification of substrates may cause extra expense in a variety of ways. Incorrectly classified patterns may be matched via a library of defect pattern classifications to underlying causes. The underlying causes may further be correlated to corrective actions. Inconsistent classification may delay diagnosis of a root cause of defects, by not providing an internally consistent picture of the health of the manufacturing system. Delaying diagnosis of a deficiency of a manufacturing system may increase costs, for example by increasing the materials, energy, and time expended on producing defective products, increasing wear on components of the manufacturing system, costs associated with producing, identifying, and discarding defective products, and the like. Incorrectly classified defect patterns may cause corrective actions to be performed erroneously, responsive to the defect pattern classification. Performing corrective actions may be expensive. Corrective actions may involve removing a process chamber from active processing, e.g., reducing chamber green time. Corrective actions may have cost associated with their performance in terms of energy expended, materials expended, time expended, components replaced, etc. Performing incorrect corrective actions may further compound costs, by not addressing a root cause of defect formation, by further delaying appropriate corrective actions, etc.

In some embodiments, data indicative of the locations of defects on a substrate may be provided to a machine learning model. The data may be image data. The input data may be formatted for delivery to the machine learning model. The input data may include wafer map data. The input data may be derived from a list of locations of defects of the substrate, such as a KLARF file. The input data may be derived from an image, such as an image generated from data provided by a defect inspection tool. In some embodiments, methods disclosed herein enable transformation of image data to a standardized format to be provided as input to a trained machine learning model. In some embodiments, an image may be processed in the frequency domain. The boundaries of the substrate, locations of defects, etc., may be extracted from an image. A new image, to be provided to a machine learning model, may be generated. The machine learning model may be configured to receive data indicative of locations of defects of a substrate and generate as output one or more classifications of defect patterns associated with the substrate. The classifications may further be utilized in performing corrective actions, such as scheduling preventative or corrective maintenance, updating a processing procedure, or the like.

In some embodiments, a data flow may be data source agnostic. For example, providing an image indicating locations of defects to processing logic may initiate image processing, and providing data indicating locations of defects to processing logic may initiate image generation. The image provided may be based on inspection data, or may be an image further removed from inspection data, such as a screenshot of data output by an inspection tool. Processing logic may provide images based on adjusting provided substrate images and images based on provided lists of defect locations to the same machine learning model for pattern classification.

Systems and methods of the current disclosure may address one or more of these shortcomings of conventional systems. The current disclosure enables automatic (e.g., machine-driven) classification of patterns, such as defect patterns of a substrate. The current disclosure enables use of one or more models for pattern classification. Machine learning models and statistical models may be utilized to understand and/or predict results of substrate processing procedures. For example, a machine learning model and/or statistical model may be trained to receive as input values indicative of processing conditions of a substrate. In some cases, process parameters may be provided to the model as input (e.g., processing recipe set points, such as heater power, plasma generation power, duration of processing, etc.). In some cases, processing conditions may be provided to the model as input (e.g., sensor data collected during substrate processing, such as temperature, pressure, component actuation, etc.). In some cases, location data of defects of a substrate may be provided to the model as input. In some cases, a combination of data types may be provided to the model as input. The model may be configured to generate an indication of output of the processing procedure (e.g., one or more predicted measurements of a substrate resulting from processing conditions indicated by the inputs to the model). The model may be configured to generate a recommended corrective action. For example, a model may utilize indications of defect locations of one or more substrates (and/or defect pattern classifications of the one or more substrates) and sensor data associated with the one or more substrates to generate a recommendation of a corrective action.

Systems and methods of the current disclosure may address one or more of the shortcomings of conventional systems. By utilizing a model (e.g., a trained machine learning model) to perform classifications operations of defect pattern of substrates, inefficiencies associated with user classifications may be avoided. Classifications may be made by one or more processing devices, e.g., without relying on a user's time. Classifications may be performed without dedicated personnel, or even an on-site model, e.g., a classification model may be accessed via a network, over the internet, etc. Classifications may exhibit increased consistency when classification operations are performed by a model. Costs associated with inconsistent and/or incorrect classifications, such as premature maintenance, replacement of correctly functioning components, etc., may be mitigated by utilizing a model for defect pattern classification.

In some aspects of the present disclosure, a method includes obtaining, by a processing device, data indicative of locations of defects of a substrate. The method further includes generating an image indicating the locations of the defects. The method further includes providing the image indicating the locations of the defects to a trained machine learning model. The method further includes obtaining, as output from the trained machine learning model, a classification of the locations of the defects. The method further includes performing a corrective action in view of the output from the trained machine learning model.

In some aspects of the disclosure, a method includes providing, as training input to a machine learning model, a first plurality of images. Each image includes an image of a substrate. The first plurality of images indicates locations of defects of the substrates. The method further includes providing, as target output to the machine learning model, a first plurality of classifications, wherein each classification is associated with a substrate and with a pattern of defects of the substrates. The method further includes training the machine learning model to generate a trained machine learning model.

In another aspect of the disclosure, a non-transitory machine-readable storage medium stores instructions which, when executed, cause a processing device to perform operations. The operations include obtaining, by a processing device, data indicative of locations of defects of a substrate. The operations further include generating an image indicating the locations of the defects. The operations further include providing the image indicating the locations of the defects to a trained machine learning model. The operations further include obtaining, as output from the trained machine learning model, a classification of the locations of the defects. The operations further include performing a corrective action in view of the output from the trained machine learning model.

FIG. 1 is a block diagram illustrating an exemplary system 100 (exemplary system architecture), according to some embodiments. The system 100 includes a client device 120, manufacturing equipment 124, sensors 126, metrology equipment 128, predictive server 112, and data store 140. The predictive server 112 may be part of predictive system 110. Predictive system 110 may further include server machines 170 and 180.

In some embodiments, manufacturing equipment 124 (e.g., cluster tool) is part of a substrate processing system (e.g., integrated processing system). The manufacturing equipment 124 includes one or more of a controller, an enclosure system (e.g., substrate carrier, front opening unified pod (FOUP), FOUP, process kit enclosure system, substrate enclosure system, cassette, etc.), a side storage pod (SSP), an aligner device (e.g., aligner chamber), a factory interface (e.g., equipment front end module (EFEM)), a load lock, a transfer chamber, one or more processing chambers, a robot arm (e.g., disposed in the transfer chamber, disposed in the front interface, etc.), and/or the like. The enclosure system, SSP, and load lock mount to the factory interface and a robot arm disposed in the factory interface is to transfer content (e.g., substrates, process kit rings, carriers, validation wafer, etc.) between the enclosure system, SSP, load lock, and factory interface. The aligner device is disposed in the factory interface to align the content. The load lock and the processing chambers mount to the transfer chamber and a robot arm disposed in the transfer chamber is to transfer content (e.g., substrates, process kit rings, carriers, validation wafer, etc.) between the load lock, the processing chambers, and the transfer chamber. In some embodiments, manufacturing equipment 124 includes components of substrate processing systems. In some embodiments, manufacturing equipment 124 is used to produce one or more products (e.g., substrates, semiconductors, wafers, etc.). In some embodiments, manufacturing equipment 124 is used to produce one or more components to be used in substrate processing systems.

Sensors 126 may provide sensor data 142 associated with manufacturing equipment 124 (e.g., associated with producing, by manufacturing equipment 124, corresponding products, such as wafers). Sensor data 142 may be used for ascertaining equipment health and/or product health (e.g., product quality), for example. Manufacturing equipment 124 may produce products following a recipe or performing runs over a period of time. In some embodiments, sensor data 142 may include values of one or more of temperature (e.g., heater temperature), spacing (SP), pressure, High Frequency Radio Frequency (HFRF), voltage of Electrostatic Chuck (ESC), electrical current, flow (e.g., of one or more gases), power, voltage, etc. Sensor data 142 may include historical sensor data and current sensor data. Historical sensor data may be related to historical processes, e.g., manufacturing or processing runs associated with previously produced products (e.g., substrates, semiconductor wafers, or the like). Historical sensor data may be utilized as training data for training one or more models, e.g., model 190. Model 190 may be a machine learning model, a physics-based model, a statistical model, and so on. Current sensor data may be associated with an operation that is not historical, e.g., a substrate currently undergoing processing, a substrate that recently underwent processing, a target substrate of interest, or the like.

Manufacturing equipment 124 may be configured according to manufacturing parameters 150. Manufacturing parameters 150 may be associated with or indicative of parameters such as hardware parameters (e.g., settings of manufacturing equipment, such as calibration tables, equipment constants, etc., and/or data associated with equipment components, such as model, age, etc., of the manufacturing equipment 124) and/or process parameters of the manufacturing equipment (such as recipes, parameter set points, etc.). Manufacturing parameters 150 may include historical manufacturing data and/or current manufacturing data. Manufacturing parameters 150 may be indicative of input settings to the manufacturing device (e.g., heater power, gas flow, etc.). Sensor data 142 and/or manufacturing parameters 150 may be provided while the manufacturing equipment 124 is performing manufacturing processes (e.g., equipment readings may be made while processing products/substrates). Sensor data 142 may be different for each product (e.g., each wafer). Manufacturing parameters 150 may be the same or substantially the same (e.g., excluding metadata or the like) for a family of products (e.g., a product design, a processing recipe, etc.). Historical parameters may be related to historical processes, e.g., manufacturing or processing runs associated with previously produced products (e.g., substrates, semiconductor wafers, or the like). Historical parameters may be utilized as training data for training one or more models, e.g., model 190. Model 190 may be a machine learning model, a physics based model, or a statistical model in embodiments. Current parameters may be associated with an operation that is not historical, e.g., a substrate currently undergoing processing, a substrate that recently underwent processing, a target substrate of interest, or the like.

Metrology data 160 may include measurements of properties of products produced by manufacturing equipment 124. Historical sensor data, historical parameters, and metrology data 160 may be associated with produced substrates. Metrology data 160 may include data indicating associations between sets of historical and/or metrology data, e.g., sets of data corresponding to the same produced substrate. Metrology data 160 may include measured and/or predicted metrology (e.g., virtual metrology) associated with any substrate property of interest. Metrology data 160 may include data corresponding to product thickness, resistivity, sheet resistance (e.g., electrical resistivity of a thin film in a direction parallel to a plane of the film), critical dimension (CD, e.g., width of a feature), line width, feature depth, side wall height, or the like. Metrology data 160 may include multi-point metrology data, e.g., a feature (such as thickness) may be measured at multiple points of a substrate, e.g., various locations distributed throughout the spatial extent of the substrate.

Metrology data 160 may include data indicating locations of one or more defects of a substrate. Defect location data may be generated via one or more inspection tools, defect inspection tools, etc. Defect location data may include a list of locations of defects of a substrate. Defect location data may include a coordinate representation of defect locations. Defect location data may be included in a KLARF file, a CSV file, or another file type. Defect location data may include image data, e.g., an image depicting defect locations. Images depicting defects may be generated based on defect location data, based on data received from inspection tools, etc.

In some embodiments, sensor data 142, metrology data 160, and/or manufacturing parameters 150 may be processed (e.g., by the client device 120 and/or by the predictive server 112). Processing of sensor data 142 may include generating features (e.g., data features, vectors, feature vectors, etc.). In some embodiments, the features are a pattern in the sensor data 142, metrology data 160, and/or manufacturing parameters 150 (e.g., slope, width, height, peak, etc.) or a combination of values from the sensor data 142, metrology data 160, and/or manufacturing parameters 150 (e.g., power derived from voltage and current, etc.). Sensor data 142 may include features and the features may be used by predictive component 114 for performing signal processing and/or for obtaining predictive data 168, possibly for performance of a corrective action. Predictive data 168 may be any data associated with predictive system 110, e.g. predicted metrology data of a substrate, predicted properties of a substrate, predicted performance of a substrate or of manufacturing equipment 124, or the like.

Each instance (e.g., set) of sensor data 142 may correspond to a product (e.g., a wafer), a set of manufacturing equipment, a type of substrate produced by manufacturing equipment, a combination thereof, or the like. Each instance of metrology data 160 and manufacturing parameters 150 may likewise correspond to a product, a set of manufacturing equipment, a type of substrate produced by manufacturing equipment, a combination thereof, or the like. The data store may further store information associating sets of different data types, e.g. information indicative that a set of sensor data, a set of metrology data, and/or a set of manufacturing data are all associated with the same product, manufacturing equipment, type of substrate, etc.

In some embodiments, predictive system 110 may generate predictive data 168. Predictive data 168 may include predictions of future performance of manufacturing equipment 124, predictions of existing deficiencies of manufacturing equipment 124, recommended corrective actions associated with manufacturing equipment 124, etc. Predictive system 110 may generate predictive data 168 using machine learning (e.g., target output comprising data indicative of a manufacturing fault provided in predictive system 110, etc.). In some embodiments, predictive system 110 may generate predictive data 168 using physics-based modeling. In some embodiments, predictive system 110 may generate predictive data 168 using statistical modeling. Two or more of these techniques may also be combined. Operations of predictive system 110 are discussed in greater detail in connection with FIGS. 2-3 and 4A-C.

Client device 120, manufacturing equipment 124, sensors 126, metrology equipment 128, predictive server 112, data store 140, server machine 170, and server machine 180 may be coupled to each other via a network 130 for generating predictive data 168. Predictive data 168 may be used in performing corrective actions. Predictive data 168 may be utilized to determine and/or address root causes of deficiencies of manufacturing equipment 124. Predictive data 168 may be related to patterns of defects of one or more substrates. Predictive data 168 may be related to associations between types/classifications of defect patterns and root causes, corrective actions, or the like.

In some embodiments, network 130 is a public network that provides client device 120 with access to predictive server 112, data store 140, and/or other publicly available computing devices. In some embodiments, network 130 is a private network that provides client device 120 access to manufacturing equipment 124, sensors 126, metrology equipment 128, data store 140, and/or other privately available computing devices. Network 130 may include one or more Wide Area Networks (WANs), Local Area Networks (LANs), wired networks (e.g., Ethernet network), wireless networks (e.g., an 802.11 network or a Wi-Fi network), cellular networks (e.g., a Long Term Evolution (LTE) network), personal area networks, routers, hubs, switches, server computers, cloud computing networks, and/or a combination thereof.

Client device 120 may include one or more computing devices such as Personal Computers (PCs), laptops, mobile phones, smart phones, tablet computers, netbook computers, network connected televisions ("smart TV"), network-connected media players (e.g., Blu-ray player), a set-top-box, Over-the-Top (OTT) streaming devices, operator boxes, etc. Client device 120 may include a corrective action component 122. Corrective action component 122 may receive user input (e.g., via a Graphical User Interface (GUI) displayed via the client device 120) of an indication associated with manufacturing equipment 124. In some embodiments, the corrective action component 122 transmits the indication to the predictive system 110, receives output (e.g., predictive data 168) from predictive system 110, determines a corrective action based on the output, and causes the corrective action to be implemented.

In some embodiments, predictive system 110 may further include a predictive component 114. Predictive component 114 may receive/obtain data from model 190. Predictive component 114 may use data obtained from model 190 to generate predictive data 168. In some embodiments, predictive component 114 provides predictive data 168 to client device 120, and client device 120 causes a corrective action via corrective action component 122 in view of predictive data 168. A corrective action performed by client device 120 may include displaying predictive data 168 for a user.

In some embodiments, corrective action component 122 obtains an indication of data to be included in a corrective action or presented to a user. In some embodiments, corrective action component 122 retrieves the data, and displays the data for a user. Retrieving the data may include retrieving data from data store 140. Retrieving the data may include supplying one or more inputs to model 190. Retrieving the data may include obtaining one or more outputs from model 190. Retrieving the data may include providing data and/or instructions to predictive system 110. Retrieving the data may include providing data and/or instructions to predictive component 114. Retrieving the data may include receiving output from predictive system 110 and/or predictive component 114. In some embodiments, corrective action component 122 may store data, for example in data store 140 as substrate classification data 161, substrate image data 169, and/or predictive data 168. Data store 140 may include any data which is produced as output by any methods described herein, such as methods described in connection with FIGS. 3 or FIGS. 4A-C. Data store 140 may further include any data provided as input for methods described herein.

In some embodiments, predictive server 112 may store output (e.g., predictive data 168) of the trained model(s) 190 in data store 140 and client device 120 may retrieve the output from data store 140. In some embodiments, corrective action component 122 receives an indication of a corrective action from predictive system 110 and causes the corrective action to be implemented (e.g., causes data to be displayed to a user). Each client device 120 may include an operating system that allows users to one or more of generate, view, or edit data (e.g., indication associated with manufacturing equipment 124, corrective actions associated with manufacturing equipment 124, etc.).

In some embodiments, metrology data 160 corresponds to historical property data of products (e.g., produced using manufacturing parameters associated with historical sensor data and historical manufacturing parameters) and predictive data 168 is associated with predicted property data (e.g., of products to be produced or that have been produced in conditions recorded by current sensor data and/or current parameters). In some embodiments, predictive data 168 is predicted metrology data (e.g., virtual metrology data) of the products to be produced or that have been produced according to conditions recorded as current sensor data and/or current manufacturing parameters. In some embodiments, predictive data 168 is or includes an indication of abnormalities (e.g., abnormal products, abnormal components, abnormal manufacturing equipment, abnormal energy usage, etc.) and/or one or more causes of the abnormalities. In some embodiments, predictive data 168 includes an indication of change over time or drift in some component of system 100. Predictive data 168 may include an indication of change in one or more components of manufacturing equipment 124. Predictive data 168 may include an indication of change in sensors 126. Predictive data 168 may include an indication of change in metrology equipment 128. In some embodiments, predictive data 168 includes an indication of an end of life of a component of manufacturing equipment 124, sensors 126, metrology equipment 128, or the like.

In some embodiments, data store 140 includes metrology data 160. Metrology data 160 may include defect data 162. Defect data 162 may include indications of defects of one or more substrates. Defect data 162 may include a list of defect locations. Defect data 162 may include an image of a substrate indicating defect locations. Defect data 162 may be based on output of metrology equipment 128, such as a defect inspection tool. Defect data 162 may include a KLARF file.

In some embodiments, defect data 162 is provided to predictive system 110. Defect data 162 may be provided to predictive component 114. Defect data 162 may be provided to model 190. Defect data 162 may be utilized to generate output from predictive system 110. Defect data 162 may be utilized to generate predictive data 168 as output from predictive system 110. Defect data 162 may be utilized to generate substrate image data 169 as output from predictive system 110. Defect data 162 may be utilized to generate substrate classification data 161 as output from predictive system 110.

Substrate image data 169 may be or include output from metrology equipment 128, client device 120, predictive system 110, etc. Substrate image data 169 may be generated based on metrology data 160, defect data 162, etc. Substrate image data 169 may be adjusted image data, e.g., image data formatted and/or adjusted to a standard style. Substrate image data 169 may be provided as input to a trained machine learning model, e.g., model 190. Substrate image data 169 may be provided as input to predictive system 110. Output may be generated based on substrate image data 169. Output may include classification of one or more substrates. Output may be or include substrate classification data 161. Output may classify a pattern of defects of a substrate, e.g., a shape of the pattern of defects. Defect pattern classifications may include, for example, edge, crescent, scratch, streak, starburst, random, etc.

Substrate classification data 161 may include data associated with corrective actions. Substrate classification data 161 may include recommended corrective actions. Substrate classification data 161 may include data associating patterns of defects with root causes. Substrate classification data 161 may include data associating patterns of defects with corrective actions. Substrate classification data 161 may include recommended corrective actions such as providing an alert to a user, performing a calibration, adjusting a process recipe, performing corrective maintenance, performing preventative maintenance, replacing one or more components, adjusting equipment constants associated with manufacturing equipment 124, etc. Predictive data 168 may include data associating substrate classifications to corrective actions, root causes, etc.

Performing manufacturing processes that result in defective products can be costly in time, energy, products, components, manufacturing equipment 124, the cost of identifying the defects and discarding the defective product, etc. By inputting data to predictive system 110, receiving output, and performing a corrective action, system 100 can have the technical advantage of avoiding the cost of producing, identifying, and discarding defective products. System 100 may provide data as input to predictive system 110. Data input to predictive system 110 may include metrology data 160. Data input to predictive system 110 may include defect data 162. Data input to predictive system 110 may include substrate image data 169. Output from predictive system 110 may include predictive data 168. Output from predictive system 110 may include substrate classification data 161. A corrective action may be performed based on output from predictive system 110. A corrective action may be selected based on predictive data 168 and/or substrate classification data 161.

Performing manufacturing processes that result in failure of the components of the manufacturing equipment 124 can be costly in downtime, damage to products, damage to equipment, express ordering replacement components, etc. By inputting data to predictive system 110, receiving output, and performing a corrective action, system 100 can have the technical advantage of avoiding costs associated with wear of components of manufacturing equipment 124. Results of wear of components of manufacturing equipment 124 may include unexpected and/or premature component failure. Results of wear of components of manufacturing equipment 124 may include processing system downtime, including unscheduled downtime. Results of wear of components of manufacturing equipment 124 may include productivity loss. Results of wear of components of manufacturing equipment 124 may include unexpected equipment failure. Results of wear of components of manufacturing equipment 124 may include product scrap. Results of wear of components of manufacturing equipment 124 may include wasted material, energy, etc.

Monitoring the performance over time of components, e.g. manufacturing equipment 124, sensors 126, metrology equipment 128, and the like, may provide indications of degrading components. Monitoring the performance of a component (e.g., a substrate support) over time may extend the component's operational lifetime, for instance if, after a standard replacement interval passes, measurements indicative that the component may still perform well (e.g., performance above a threshold) for a time (e.g., until the next planned maintenance event). Monitoring substrate classification data 161 associated with a process tool may provide indications of aging, drifting, and/or degrading components.

Manufacturing parameters may be suboptimal for producing products. Utilizing suboptimal parameters may have costly results. Utilizing suboptimal parameters may cause the use of increased resources, such as energy, coolant, gases, material, etc. Utilizing suboptimal parameters may cause an increase in time to product products. Utilizing suboptimal parameters may cause increased rates of component failure. Utilizing suboptimal parameters may cause an increased proportion of defective products to be produced. By inputting data to predictive system 110, receiving output, and performing a corrective action, system 100 can have the technical advantage of avoiding and/or reducing costs associated with suboptimal manufacturing parameters.

Corrective action may be associated with one or more of Computational Process Control (CPC), Statistical Process Control (SPC) (e.g., SPC on electronic components to determine process in control, SPC to predict useful lifespan of components, SPC to compare to a graph of 3-sigma, etc.), Advanced Process Control (APC), model-based process control, preventative operative maintenance, design optimization, updating of manufacturing parameters, updating manufacturing recipes, feedback control, machine learning modification, or the like.

In some embodiments, the corrective action includes providing an alert (e.g., an alarm to stop or not perform the manufacturing process if predictive data 168 indicates a predicted abnormality, such as an abnormality of the product, a component, or manufacturing equipment 124). In some embodiments, the corrective action includes providing feedback control (e.g., modifying a manufacturing parameter responsive to the predictive data 168 indicating an abnormality). In some embodiments, the corrective action includes updating a processing recipe (e.g., modifying one or more manufacturing parameters based on the predictive data 168). In some embodiments, performance of the corrective action includes causing updates to one or more manufacturing parameters. In some embodiments, performance of the corrective action includes causing updates to one or more calibration tables and/or equipment constants (e.g., a set point provided to a component may be adjusted by a value across a number of process recipes, for example voltage applied to a heater may be increased by 3% for all processes using the heater).

Manufacturing parameters may include hardware parameters and/or process parameters. Hardware parameters may include indications of components installed in a system. Hardware parameters may include a history of replaced components. Hardware parameters may include indications of updates to a system. Hardware parameters may include indications of software/firmware versions of a system. Process parameters may include property set points, such as temperature, pressure, gas flow, electrical current, voltage, etc. Process parameters may include equipment constants, such as calibration tables. In some embodiments, the corrective action includes causing preventative operative maintenance. Preventative maintenance may include replacing, processing, calibrating, and/or cleaning components of manufacturing equipment 124. In some embodiments, the corrective action includes causing design optimization. Design optimization may include updating manufacturing parameters. Design optimization may include updating one or more manufacturing processes. Design optimization may include updating manufacturing equipment 124. In some embodiments, the corrective action includes a updating a recipe. Updating a recipe may include updating one or more property set points. Updating a recipe may include updating timing associated with one or more set points. Updating a recipe may include updating timing associated with one or more modes of operation of manufacturing equipment 124, such as adjusting timing of a transition between an idle mode, sleep mode, warm-up mode, etc. In some embodiments, a corrective action may include providing an alert to a user. A corrective action may be recommended by model 190. A corrective action may be performed by client device 120.

Predictive server 112, server machine 170, and server machine 180 may each include one or more computing devices such as a rackmount server, a router computer, a server computer, a personal computer, a mainframe computer, a laptop computer, a tablet computer, a desktop computer, Graphics Processing Unit (GPU), accelerator Application-Specific Integrated Circuit (ASIC) (e.g., Tensor Processing Unit (TPU)), etc.

Predictive server 112 may include predictive component 114. Predictive component 114 may be used to produce predictive data 168. In some embodiments, predictive component 114 may receive defect data 162 and/or substrate image data 169 and generate output for performing corrective action associated with manufacturing equipment 124 based on the input data. Input data may be received from client device 120. Input data may be retrieved from data store 140.

Manufacturing equipment 124 may be associated with one or more machine leaning models, physics-based models, statistical models, and so on, e.g., model 190. Machine learning models and other models associated with manufacturing equipment 124 may perform many tasks, including process control, classification, performance predictions, etc. Model 190 may be trained using data associated with manufacturing equipment 124 or products processed by manufacturing equipment 124, e.g., sensor data 142 (e.g., collected by sensors 126), manufacturing parameters 150 (e.g., associated with process control of manufacturing equipment 124), metrology data 160 (e.g., generated by metrology equipment 128), etc.

One type of machine learning model that may be used to perform some or all of the above tasks is an artificial neural network, such as a deep neural network. Artificial neural networks generally include a feature representation component with a classifier or regression layers that map features to a desired output space. A convolutional neural network (CNN), for example, hosts multiple layers of convolutional filters. Pooling is performed, and non-linearities may be addressed, at lower layers, on top of which a multi-layer perceptron is commonly appended, mapping top layer features extracted by the convolutional layers to decisions (e.g. classification outputs).

A recurrent neural network (RNN) is another type of machine learning model. A recurrent neural network model is designed to interpret a series of inputs where inputs are intrinsically related to one another, e.g., time trace data, sequential data, etc. Output of a perceptron of an RNN is fed back into the perceptron as input, to generate the next output.

Deep learning describes a class of machine learning algorithms that use a cascade of multiple layers of nonlinear processing units for feature extraction and transformation. Each successive layer uses the output from the previous layer as input. Deep neural networks may learn in a supervised (e.g., classification) and/or unsupervised (e.g., pattern analysis) manner. Deep neural networks include a hierarchy of layers, where the different layers learn different levels of representations that correspond to different levels of abstraction. In deep learning, each level learns to transform its input data into a slightly more abstract and composite representation. In an image recognition application, for example, the raw input may be a matrix of pixels; the first representational layer may abstract the pixels and encode edges; the second layer may compose and encode arrangements of edges; the third layer may encode higher level shapes (e.g., recognizing structures of a substrate such as gates, masks, etc.); and the fourth layer may generate a classification output. Notably, a deep learning process can learn which features to optimally place in which level on its own. The "deep" in "deep learning" refers to the number of layers through which the data is transformed. More precisely, deep learning systems have a substantial credit assignment path (CAP) depth. The CAP is the chain of transformations from input to output. CAPs describe potentially causal connections between input and output. For a feedforward neural network, the depth of the CAPs may be that of the network and may be the number of hidden layers plus one. For recurrent neural networks, in which a signal may propagate through a layer more than once, the CAP depth is potentially unlimited.

Training of a machine learning model may be achieved in a supervised learning manner. Supervised training involves feeding a training dataset consisting of labeled inputs through the network, observing its outputs, defining an error, and using techniques such as gradient descent and backpropagation to tune the weights of the network across all its layers and nodes such that the error is minimized. Error may be defined by measuring one or more differences between the calculated output and the label. In many applications, repeating this process across the many labeled inputs in the training dataset yields a network that can produce correct output when presented with inputs that are different than the ones present in the training dataset.

In some embodiments, predictive component 114 may use one or more models 190 to determine the output for performing the corrective action based on current data. Model 190 may be a single model, an ensemble model, or a collection of models used to process data. Model 190 may include one or more physics-based digital twin models, supervised machine learning models, unsupervised machine learning models, semi-supervised machine learning models, statistical models, etc.

In some embodiments, client device 120 may provide input data to predictive system 110. The input data may include metrology data 160. The input data may include defect data 162. The input data may include substrate image data 169.

In some embodiments, data indicative of properties of a substrate to be produced using a manufacturing system (e.g., predictive data) is provided to a model such as a trained machine learning model (e.g., model 190). The model may be trained to output data indicative of a corrective action to produce a substrate with different characteristics. In some embodiments, data indicative of predictive properties of a substrate produced using manufacturing equipment 124, and metrology data of a substrate produced with that substrate support are provided as input to a model (e.g., model 190). The model may predict underlying causes for differences between predicted and measured data (e.g., manufacturing fault, component aging or drift, etc.).

Historical sensor data, historical parameters, historical substrate classification data, and/or metrology data 160 may be used in combination with current sensor data, current parameters, and/or other current data to detect drift, changes, aging, etc. of components of manufacturing equipment 124. Substrate classification data 161 monitored over time may contain information indicative of changes to one or more components of manufacturing equipment 124, e.g., due to aging, drift, component failure, deposition or removal of material, etc. Predictive component 114 may use combinations and comparisons of these data types to generate predictive data 168. In some embodiments, predictive data 168 includes data predicting the lifetime of components of manufacturing equipment 124, sensors 126, etc.

In some embodiments, predictive component 114 receives data, such as sensor data 142, manufacturing parameters 150, metrology data 160, substrate image data 169, etc. Predictive component may perform pre-processing such as extracting patterns in the data or combining data to new composite data. Predictive component 114 may then provide the data to model 190 as input. Model 190 may include a physics-based model, accepting as input sensor data 142, manufacturing parameters 150, substrate image data 169, or the like. Model 190 may include a trained machine learning model, a statistical model, etc., configured to further process data associated with properties of a substrate, performance of manufacturing equipment 124, etc. Predictive component 114 may receive from model 190 predictive data, indicative of substrate manufacturing system performance, predicted substrate properties, a manufacturing fault, component drift, or the like. Predictive component 114 may then cause a corrective action to occur (e.g., recommend a corrective action to a user). The corrective action may include sending an alert to client device 120. The corrective action may also include updating manufacturing parameters of manufacturing equipment 124. The corrective action may also include generating predictive data 168, indicative of chamber or instrument drift, aging, or failure.

Data store 140 may be a memory (e.g., random access memory), a drive (e.g., a hard drive, a flash drive), a database system, or another type of component or device capable of storing data. Data store 140 may include multiple storage components (e.g., multiple drives or multiple databases) that may span multiple computing devices (e.g., multiple server computers). The data store 140 may store sensor data 142, manufacturing parameters 150, metrology data 160, substrate image data 169, substrate classification data 161, and predictive data 168. Sensor data may include sensor data time traces over the duration of manufacturing processes, associations of data with physical sensors, pre-processed data, such as averages and composite data, and data indicative of sensor performance over time (i.e., many manufacturing processes). Manufacturing parameters 150 and metrology data 160 may contain similar features. Predictive data 168 may include data output by predictive system 110. Defect data 162 may include data indicating defect locations of defects of a substrate. Substrate image data 169 may include images of substrates, including defect locations. Substrate classification data 161 may include classifications of defect patterns of substrates. Historical data may be utilized for training model 190. Metrology data 160 may be utilized for training model 190, may include predicted metrology data output by model 190, etc. Metrology data 160 may be metrology data of produced substrates, as well as sensor data, manufacturing data, and model data corresponding to those products. Metrology data 160 may be leveraged to design processes for making further substrates. Predictive data 168 may include predictions of metrology data resulting from operation of a substrate support, predictions of component drift, aging, or failure, predictions of component lifetimes, etc. Predictive data 168 may also include data indicative of components of system 100 aging and failing over time.

In some embodiments, predictive system 110 further includes server machine 170 and server machine 180. Server machine 170 includes a data set generator 172 that is capable of generating data sets (e.g., a set of data inputs and a set of target outputs) to train, validate, and/or test model 190. Some operations of data set generator 172 are described in detail below with respect to FIGS. 2 and 4A. In some embodiments, data set generator 172 may partition historical data into a training set, a validating set, and a testing set. As an example, a training set may be sixty percent of the historical data, a validating set may include twenty percent of the data, and a testing set may include twenty percent of the historical data. In some embodiments, predictive system 110 generates multiple sets of features (e.g., feature vectors, vectors, attributes, etc.). For example a first set of features may correspond to a first set of types of input data that correspond to each of the data sets. The first type of input data may be a subset of inputs, such as a subset of defect data 162, a subset of substrate image data 169, etc. The data sets may include a training set, a validation set, and/or a testing set. A second set of features may correspond to a second set of types of sensor data that correspond to each of the data sets.

In some embodiments, server machine 180 includes a training engine 182, a validation engine 184, selection engine 185, and/or a testing engine 186. An engine (e.g., training engine 182, a validation engine 184, selection engine 185, and a testing engine 186) may refer to hardware, software, firmware, microcode, or a combination thereof. Hardware may include circuitry, dedicated logic, programmable logic, microcode, a processing device, etc. Software may include instructions run on a processing device, a general purpose computer system, a dedicated machine, etc. The training engine 182 may be capable of training a model 190 using one or more sets of features associated with the training set from data set generator 172. The training engine 182 may generate multiple trained models 190, where each trained model 190 corresponds to a distinct set of features of the training set. For example, a first trained machine learning model may have been trained using all features (e.g., data inputs X1-X5), a second trained machine learning model may have been trained using a first subset of the features (e.g., data inputs X1, X2, X4), and a third trained machine learning model may have been trained using a second subset of the features (e.g., data inputs X1, X3, X4, and X5) that may partially overlap the first subset of features. Data set generator 172 may receive the output of a trained model (e.g., 190). Data set generator 172 may collect that data into training, validation, and testing data sets. Data set generator may and use the data sets to train a second model. Some or all of the operations of server machine 180 may be used to train various types of models, including physics-based models, supervised machine learning models, unsupervised machine learning models, etc.

The validation engine 184 may be capable of validating a trained model 190 using a corresponding set of features of the validation set from data set generator 172. For example, a first trained model 190 that was trained using a first set of features of the training set may be validated using the first set of features of the validation set. The validation engine 184 may determine an accuracy of each of the trained models 190 based on the corresponding sets of features of the validation set. The validation engine 184 may discard trained models 190 that have an accuracy that does not meet a threshold accuracy. In some embodiments, the selection engine 185 may be capable of selecting one or more trained models 190 that have an accuracy that meets a threshold accuracy. In some embodiments, the selection engine 185 may be capable of selecting the trained model 190 that has the highest accuracy of the trained models 190.

The testing engine 186 may be capable of testing a trained model 190 using a corresponding set of features of a testing set from data set generator 172. For example, a first trained model 190 that was trained using a first set of features of the training set may be tested using the first set of features of the testing set. The testing engine 186 may determine a trained model 190 that has the highest accuracy of all of the trained models based on the testing sets.

Model 190 may refer to a machine learning model. Model 190 which may be the model artifact that is created by the training engine 182 using a training set that includes data inputs and corresponding target outputs (correct answers for respective training inputs). Model 190 may additionally or alternatively refer to a statistical model or physics-based model. Patterns in the data sets can be found that map the data input to the target output (the correct answer), and the model 190 is provided mappings that captures these patterns. In some embodiments, model 190 may predict properties of substrates. In some embodiments, model 190 may predict failure modes of manufacturing chamber components.

Model 190 may refer to a trained physics-based model. A trained physics-based model may be configured to find solutions to one or more equations described physical quantities of a processing chamber, such as mass flow (e.g., gas flow), heat transfer equations, fluid dynamics equations, or the like. In some embodiments, assumptions used to generate the physics-based model may not be entirely accurate (e.g., due to imprecise measurements, manufacturing or material defects, mismatches of manufacturing tolerances of components, components aging, drifting, or acting differently than predicted, or the like). Training a physics-based model may correct for one or more of these assumptions that introduces error into the physics-based model, e.g., by allowing one or more parameters of the model to be altered to better fit to training data.

Predictive component 114 may provide input data to a trained model 190 and may run the trained model 190 on the input to obtain one or more outputs. Predictive component 114 may be capable of determining (e.g., extracting) predictive data 168 from the output of the model 190 and may determine (e.g., extract) confidence data from the output that indicates a level of confidence that the predictive data 168 is an accurate predictor of a process associated with the input data for products produced or to be produced, or an accurate predictor of components of manufacturing equipment 124. Predictive component 114 may be capable of determining predictive data 168, including predictions on finished substrate properties and predictions of effective lifetimes of components of manufacturing equipment 124, sensors 126, or metrology equipment 128 based on the output of model 190. Predictive component 114 or corrective action component 122 may use the confidence data to decide whether to cause a corrective action associated with the manufacturing equipment 124 based on predictive data 168. Presentation component 115 may utilize confidence data, e.g., in visually presenting some regions of output space of a model as uncertain (e.g., by showing data in a different color, shape, shade, size, level of transparency, or the like to indicate mode confidence).

The confidence data may include or indicate a level of confidence. As an example, predictive data 168 may indicate the properties of a finished wafer given a set of manufacturing inputs (e.g., current parameters 154), including the use of manufacturing equipment 124. The confidence data may indicate that the predictive data 168 is an accurate prediction for products associated with at least a portion of the input data. In one example, the level of confidence is a real number between 0 and 1 inclusive, where 0 indicates no confidence that the predictive data 168 is an accurate prediction for products processed according to input data and 1 indicates absolute confidence that the predictive data 168 accurately predicts properties of products processed according to input data. Responsive to the confidence data indicating a level of confidence below a threshold level for a predetermined number of instances (e.g., percentage of instances, frequency of instances, total number of instances, etc.) the predictive component 114 may cause the model 190 to be re-trained (e.g., based on current sensor data 146, current manufacturing parameters 150, metrology data 160, etc.).

For purpose of illustration, rather than limitation, aspects of the disclosure describe the training of one or more models 190 using historical data and inputting current data into the one or more trained models 190 to determine predictive data 168. In other implementations, a heuristic model or rule-based model is used to determine predictive data (e.g., without using a trained machine learning model). Predictive component 114 may monitor historical data and metrology data 160. Any of the information described with respect to data inputs 210 of FIG. 2 may be monitored or otherwise used in the heuristic or rule-based model.

In some embodiments, the functions of client device 120, predictive server 112, server machine 170, and server machine 180 may be provided by a fewer number of machines. For example, in some embodiments server machines 170 and 180 may be integrated into a single machine, while in some other embodiments, server machine

170, server machine 180, and predictive server 112 may be integrated into a single machine. In some embodiments, client device 120 and predictive server 112 may be integrated into a single machine.

In general, functions described in one embodiment as being performed by client device 120, predictive server 112, server machine 170, and server machine 180 can also be performed on predictive server 112 in other embodiments, if appropriate. In addition, the functionality attributed to a particular component can be performed by different or multiple components operating together. For example, in some embodiments, predictive server 112 may determine the corrective action based on the predictive data 168. In another example, client device 120 may determine the predictive data 168 based on output from model 190 (e.g., a trained machine learning model or a physics-based digital twin model).

In addition, the functions of a particular component can be performed by different or multiple components operating together. One or more of predictive server 112, server machine 170, or server machine 180 may be accessed as a service provided to other systems or devices through appropriate application programming interfaces (API).

In embodiments, a "user" may be represented as a single individual. However, other embodiments of the disclosure encompass a "user" being an entity controlled by a plurality of users and/or an automated source. For example, a set of individual users federated as a group of administrators may be considered a "user."

Embodiments of the disclosure may be applied to data quality evaluation, feature enhancement, model evaluation, Virtual Metrology (VM), Predictive Maintenance (PdM), limit optimization, or the like. Embodiments of the disclosure may be applied to any trained modeling system, e.g., may provide model evaluation, model verification, a representation of model learning, or the like, for any machine learning model, any machine learning model associated with manufacturing and/or processing products, any machine learning model that predicts metrology of a wafer to be processed, or the like.

Figure 2:
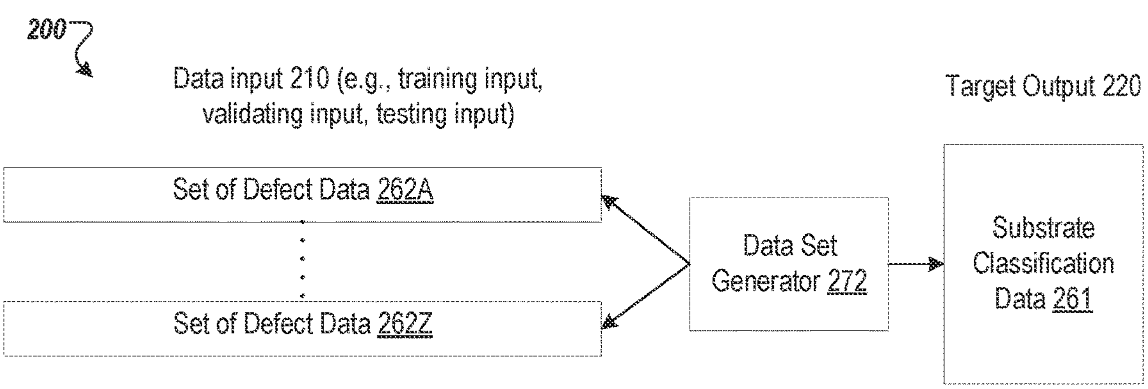
FIG. 2 is a block diagram of an example data set generator used to create data sets for a model, according to some embodiments.

FIG. 2 is a block diagram of an example data set generator 272 (e.g., data set generator 172 of FIG. 1), used to create data sets for a model (e.g., model 190 of FIG. 1), according to some embodiments. A data set generator 272 may be part of server machine 170 of FIG. 1. In some embodiments, system 100 of FIG. 1 includes multiple models. In such cases, each model may have a separate data set generator, or models may share a data set generator.

Depicted in FIG. 2 is a data set generator 272 associated with a machine learning model. The machine learning model is configured to receive as input data indicative of defects of a substrate. The machine learning model is configured to generate as output a classification of a pattern of defects. A model (e.g., a machine learning model, a physics-based model, a statistical model, etc.) may be configured to perform one or more of many different tasks. For example, a model may receive sensor data and generate as output feedback control signals for adjusting processing conditions. A model may receive processing parameters and predict performance of a substrate (e.g., predict metrology of the substrate resulting from a process recipe). A model may receive an image (e.g., a block diagram of a target substrate design) and generate a related image (e.g., a realistic image of a simulate substrate). A model may receive an indication of a target product design and may generate as output a process recipe predicted to produce a product of that design. A model may receive measurements of one or more components of a manufacturing system and generate as output a predicted performance of the system. Any of these or many other specific use cases of models may benefit from methods and systems described herein, e.g., for displaying one or more indications of model learning. Any (machine learning) model that produces output based on input may benefit from methods described herein. Any model that maps a set of inputs to one or more outputs may benefit from methods and systems described herein.

Referring to FIG. 2, system 200 containing data set generator 272 (e.g., data set generator 172 of FIG. 1) creates data sets for a machine learning model (e.g., model 190 of FIG. 1). Data set generator 272 may create data sets using sensor data, e.g., historical defect data of defect data 162 of FIG. 1. In some embodiments, data set generator 272 may create data sets for a model using data output by another model, another function, another processing tool, or the like. Data set generator 272 may create data sets for a model using data such as predictive data 168, substrate image data 169, substrate classification data 161, etc. Models that receive different types of data than these as input or generate different types of data than these as output may receive data sets from data set generator 272 that were creating from corresponding data types. In some embodiments, data set generator 272 creates training input (e.g., data input 210) from defect data 162 associated with one or more substrates and/or substrate image data 169 associated with one or more substrates. Data set generator 272 also generates target output 220 for training a machine learning model. Target output may include classification data. Classification data may include classification of patterns of defects of one or more substrates processed by a manufacturing system, or the like. In some embodiments, defect data 162 includes indications of locations of defects of one or more substrates. Substrate image data 169 may include images of substrates. The images may include indications (e.g., visual indications) of locations of defects of the substrates. Training input data 210 and target output data 220 are supplied to a machine learning model. For the purposes of illustration of the operation of a data set generator for training a model, data set generator 272 is described as training a machine learning model that accepts input data indicative of defect locations of a substrate and generates as output a classification of a defect pattern of the substrate, but any other configuration of model (e.g., machine learning model) may benefit from aspects of the present disclosure.

It is within the scope of this disclosure for training input 210 and target output 220 to be represented in a variety of different ways. A two-dimensional map of substrate properties, a function recreating the map, or other data indicative of defect data of a substrate may be used as training input 210. Data sets may include processed data, smoothed data, cleaned data (e.g., outliers removed, etc.), combined data, data collected into data features (e.g., vectors, feature vectors, etc.), or the like.

In some embodiments, data set generator 272 generates a data set that includes one or more data inputs 210, and may include one or more target outputs 220 that correspond to the data inputs 210. The data set may be a training set, validating set, testing set, etc. The data inputs 210 may be training inputs, validating inputs, testing inputs, etc. The data set may also include mapping data that maps the data inputs 210 to the target outputs 220. Data inputs 210 may also be referred to as "features," "attributes," or "information." In some embodiments, data set generator 272 provides the data set to the training engine 182, validating engine 184, or testing engine 186 of FIG. 1. The data set may be used to train, validate, or test model 190 of FIG. 1. Some embodiments of generating a training set may further be described with respect to FIG. 4A.

In some embodiments, data set generator 272 may generate a first data input corresponding to a first set of defect data 262A to train, validate, or test a first model. Data set generator 272 may generate a second data input corresponding to a second set of defect data 262B to train, validate, or test a second model. Instead or additionally, a first and second models may be trained, validated, and/or tested based on sets of substrate image data 169. For example, a machine learning model may be trained based on defect data, substrate image data, or both. Separate machine learning models may be trained based on different types of input data, or a model may be trained to receive multiple types of input.

In some embodiments, data set generator 272 may perform operations on one or more of data input 210 and target output 220. Data set generator 272 may extract patterns from the data (slope, curvature, etc.), may combine data (average, feature production, etc.), or may separate data into groups (e.g., train a model on a subset of the predicted performance data) and use the groups to train separate models.

Data inputs 210 and target outputs 220 to train, validate, or test a model may include information for a particular substrate processing recipe. For example, data inputs 210 and target outputs 220 may be associated with a particular substrate design. Data inputs 210 and target outputs 220 may include information for a particular substrate processing system. For example, data inputs 210 and target outputs 220 may be associated with a particular set of manufacturing equipment. Data inputs 210 and target outputs 220 may include information for a particular type of processing, target substrate design, target substrate property, or may be grouped together in another way.

In some embodiments, data set generator 272 may generate a set of target output 220, including substrate classification data 261. Target output 220 may be separated into sets corresponding to sets of input data. Different sets of target output 220 may be used in connection with the similarly defined sets of data input 210, including training different models, using different sets for training, validating, and testing, etc.

In some embodiments, a model may be trained without target output 220 (e.g., an unsupervised or semi-supervised model). A model trained that is not provided with target output may, for example, be trained to recognize significant (e.g., outside an error threshold) differences between predicted and measured performance data. A model trained without target output may be an unsupervised model.

In some embodiments, the information used to train the model may be from specific types of manufacturing equipment (e.g., manufacturing equipment 124 of FIG. 1) of a manufacturing facility having specific characteristics. Using information from a specific tool, facility, or the like may allow the trained machine learning model to determine outcomes for a specific group of manufacturing equipment 124. The model may be able to generate output based on input of predicted performance data and measured performance data associated with one or more components sharing characteristics of the specific group. In some embodiments, the information used to train the model may be for components from two or more manufacturing facilities and may allow the model to determine outcomes for components based on input from one manufacturing facility.

In some embodiments, subsequent to generating a data set and training, validating, or testing a model using the data set, the model may be further trained, validated, or tested, or adjusted. For example, additional data may be provided to the model from substrates processed after the model was trained, validated, and tested as retraining data, revalidating data, retesting data, or the like.

In some embodiments, a data set generator performing similar functions to data set generator 272 may be utilized to train a physics-based model. A physics-based model may be configured to generate an output based on a physical understanding of a system, based on physical assumptions of the operation of a system, based on one or more numerical solutions to one or more physical equations (e.g., heat transfer equations, mass balance equations, fluid dynamics equations, etc.), or the like. A physics-based model may be trained in a similar manner to a machine learning model. The physics-based model may be provided with training input and target output. Training the physics-based model may include adjusting one or more parameters, weights, biases, or the like, to bring model output into better alignment with the target output.

In some embodiments, a physics-based model may receive a set of inputs (e.g., indicative of processing conditions of a substrate). The physics-based model may generate an output based on the set of inputs (e.g., predicted metrology data of the substrate). The physics-based model may be provided with a target output (e.g., measured metrology data of the substrate). The physics-based model may adjust one or more parameters of the model to generate output (e.g., predicted metrology data) that is more similar to the target output than before the adjustment was made.

Figure 3:
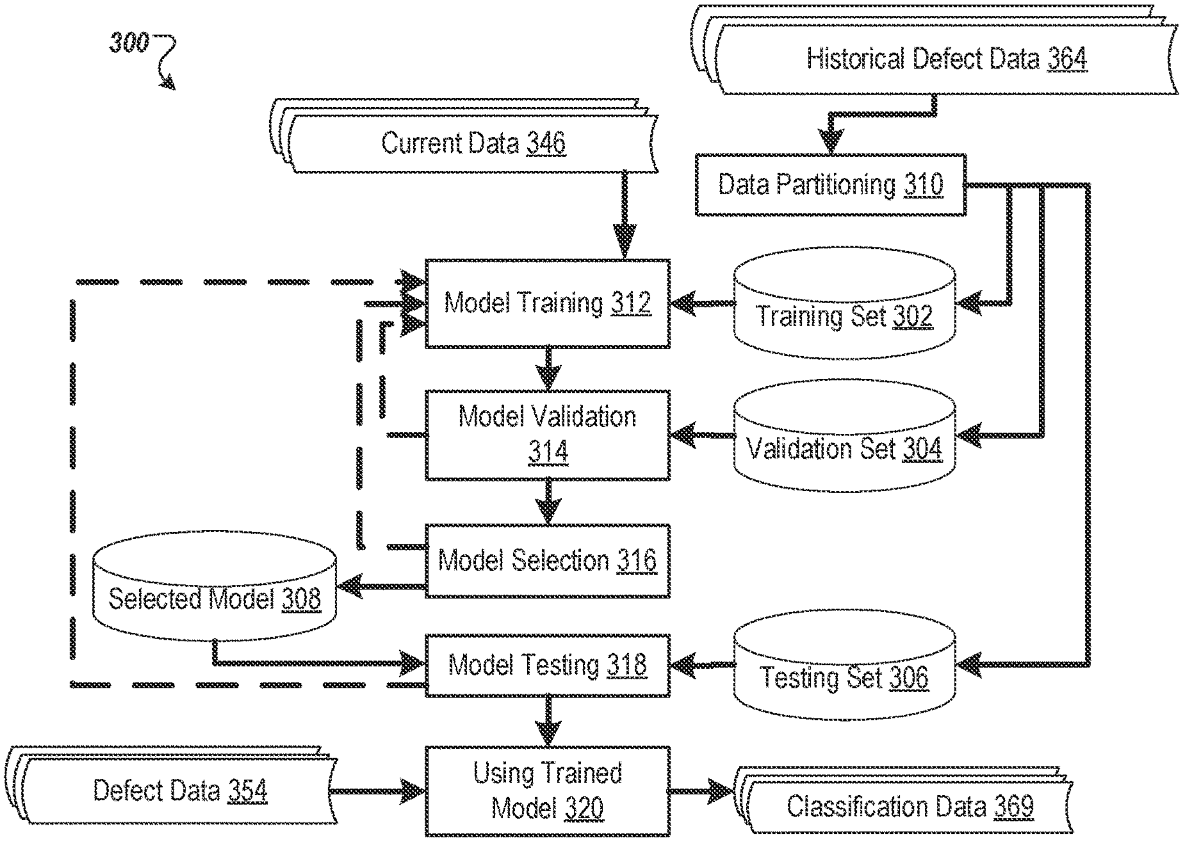
FIG. 3 is a block diagram illustrating system for generating output data for analysis of substrate defect patterns, according to some embodiments.

FIG. 3 is a block diagram illustrating system 300 for generating output data for analysis of substrate defect patterns (e.g., generating predictive data 168 of FIG. 1), according to some embodiments. System 300 may be used to train a model (e.g., a machine learning model) and to generate data that may be utilized in performance of corrective actions. Some or all of the operations of system 300 may be used to generate output data of a machine learning model, e.g., predictive data 168 of FIG. 1. Some or all of the operations of system 300 may be used to generate output data of a physics-based model, e.g., predictive data 168 of FIG. 1.

Referring to FIG. 3, at block 310, the system 300 performs data partitioning of historical defect data 364 to generate training set 302, validation set 304, and testing set 306. System 300 may be or include components of predictive system 110 of FIG. 1. Data partitioning may be performed via data set generator 172 of server machine 170 of FIG. 1. Historical defect data 364 may include defect data 162, substrate image data 169, etc. For example, the training set may be 60% of the historical data, the validation set may be 20% of the historical data, and the testing set may be 20% of the historical data.

At block 312, the system 300 performs model training (e.g., via training engine 182 of FIG. 1) using the training set 302. The system 300 may train one model or may train multiple models using multiple sets of features (e.g., feature vectors) of the training set 302. For example, system 300 may train a machine learning model to generate a first trained machine learning model using the first set of features. in the training set. System 300 may generate a second trained machine learning model using a second set of features in the training set (e.g., different data than the data used to train the first machine learning model). In some embodiments, the first trained machine learning model and the second trained machine learning model may be combined to generate a third trained machine learning model. The third combined machine learning model may be a better predictor than the first or the second trained machine learning model on its own. In some embodiments, sets of features used in generating and/or using models may overlap. For example, one model may be trained with performance data indicative of film thickness, and another model with performance data indicative of both film thickness and film stress, different models may be trained with data (e.g., defect data) from different locations of a substrate, models may be trained including input from a different set of sensors or manufacturing parameters, etc. In some embodiments, hundreds of models may be generated including models with various permutations of features. Various models and combinations of models may be trained, combined, tested, etc.

At block 314, the system 300 performs model validation. Model validation may be performed via validation engine 184 of FIG. 1. Validation may be performed using the validation set 304. System 300 may validate each of the trained models using a corresponding set of attributes of the validation set 304. For instance, validation set 304 may use the same subset of historical data types (e.g., associated with the same on-wafer performance features, the same sensors, the same input parameters, etc.) used in training set 302, but for different input conditions. In some embodiments, the system 300 may validate hundreds of models generated at block 312. The models validated may include models trained with data associated with various permutations of data features, various combinations of models, etc.

As part of model validation of block 314, system 300 may determine an accuracy of each of the one or more trained models. System 300 may determine whether one or more of the trained models has an accuracy that meets a threshold accuracy. Responsive to determining that none of the trained models has an accuracy that meets a threshold accuracy, flow returns to block 312 where the system 300 performs model training. Upon flow returning to block 312, training operations may be adjusted. For example, training may be performed using different sets of features of the training set. Models may be combined differently during operations associated with returning flow to block 312. Responsive to determining that one or more of the trained models has an accuracy that meets a threshold accuracy, flow continues to block 316. The system 300 may discard the trained machine learning models that have an accuracy that is below the threshold accuracy (e.g., based on the validation set).

At block 316, the system 300 may perform model selection to determine which of the one or more trained models that meet the threshold accuracy has the highest accuracy. Selection operations of block 316 may be performed via selection engine 185 of FIG. 1. The model that has the highest accuracy based on model validation may be designated as selected model 308. If only a single model was trained, then the operations of block 316 may be skipped. Responsive to determining that two or more of the trained models that meet the threshold accuracy have the same accuracy, flow may return to block 312 where the system 300 performs model training using further refined training sets (e.g., corresponding to further refined sets of attributes) for determining a trained model that has the highest accuracy. Responsive to determining that two or more of the trained models that meet the threshold accuracy have the same accuracy, additional model validation may be performed. Additional model validation may be performed using different and/or additional data.

At block 318 system 300 performs model testing using the testing set 306 to test the selected model 308. Model testing may be performed via testing engine 186 of FIG. 1. The system 300 may test, using the first set of features in the testing set, the first trained machine learning model to determine the first trained machine learning model meets a threshold accuracy. Determining the first trained machine learning model meets a threshold accuracy may be performed based on the first set of features of testing set 306. Responsive to accuracy of the selected model 308 not meeting the threshold accuracy, flow continues to block 312 where the system 300 performs model training. Selected model 308 may not meet threshold accuracy due to selected model 308 being overly fit to training set 302 and/or validation set 304. Selected model 308 not meeting a threshold accuracy in testing may indicate that selected model 308 is not applicable to data sets outside the training set and/or validation set. Retraining of selected model 308 may be performed using different training sets. The different training sets may possibly correspond to different sets of features or a reorganization of substrates (e.g., data sets) split into training, validation, and testing sets. Responsive to determining that selected model 308 has an accuracy that meets a threshold accuracy based on the testing set 306, flow continues to block 320. In at least block 312, the model may learn patterns in the simulated sensor data to make predictions and in block 318, the system 300 may apply the model on the remaining data (e.g., testing set 306) to test the predictions.

At block 320, system 300 uses the trained model to receive defect data 354 and determines (e.g., extracts), from the output of the trained model, classification data 369. Classification data 369 may classify defects of a substrate. Classification data 369 may assign a category to a pattern of defects of a substrate. Classification data 369 may be correlated to and/or include recommended corrective actions. Classification data 369 may be correlated to and/or include predicted root causes of defects of a substrate. The trained model utilized at block 320 may be selected model 308. The defect data 354 supplied at block 320 may be any data that indicates locations of defects of a substrate. Defect data 354 may include defect data 162 and/or substrate image data 169 of FIG. 1. Classification data 369 may be or include substrate classification data 161 of FIG. 1. A manufacturing system may utilize classification data 369 to perform an action. A manufacturing system may utilize classification data 369 in performance of a corrective action. A manufacturing system may utilize classification data 369 in performance of a corrective action associated with manufacturing equipment 124 of FIG. 1. A manufacturing system may utilize classification data 369 to provide an alert to a user. A manufacturing system may utilize classification data 369 to provide an alert to client device 120 of FIG. 1.

In some embodiments, retraining of the machine learning model occurs by supplying additional data to further train the model. Current data 346 may be provided at block 312. Current data 346 may be different from the data originally used to train the model by incorporating combinations of input parameters not part of the original training data, input parameters outside the parameter space spanned by the original training, or may be updated to reflect chamber specific knowledge (e.g., differences from an ideal chamber due to manufacturing tolerance ranges, aging components, drifting components, performed maintenance, etc.). Selected model 308 may be retrained based on this data. Retraining may generate an updated machine learning model. Retraining may include providing retraining input and/or retraining target output to selected model 308.

In some embodiments, one or more of the acts 310-320 may occur in various orders and/or with other acts not presented and described herein. In some embodiments, one or more of acts 310-320 may not be performed. For example, in some embodiments, one or more of data partitioning of block 310, model validation of block 314, model selection of block 316, or model testing of block 318 may not be performed. In training a physics-based digital twin model, e.g., to take as input measurements of processing conditions and produce as output predicted performance data of a substrate, a subset of these operations may be performed.

FIGS. 4A-D are flow diagrams of methods 400A-C associated with describing and/or visualizing model learning, according to certain embodiments. Methods 400A-C may be performed by processing logic that may include hardware (e.g., circuitry, dedicated logic, programmable logic, microcode, processing device, etc.), software (such as instructions run on a processing device, a general purpose computer system, or a dedicated machine), firmware, microcode, or a combination thereof. In some embodiment, methods 400A-C may be performed, in part, by predictive system 110. Method 400A may be performed, in part, by predictive system 110 (e.g., server machine 170 and data set generator 172 of FIG. 1, data set generator 272 of FIG. 2). Predictive system 110 may use method 400A to generate a data set to at least one of train, validate, or test a model, in accordance with embodiments of the disclosure. The model may be a physics-based (e.g., digital twin) model (e.g., to generate predictive performance data of a substrate), a machine learning model (e.g., to generate predictive performance data of a wafer, to generate data indicative of a corrective action associated with a component of manufacturing equipment, etc.), a statistical model, or another model trained to receive input and generate output related to substrate manufacturing or processing. Methods 400B-C may be performed by predictive server 112 (e.g., predictive component 114, etc.). Methods 400B-D may be performed by other components of predictive system 110. Operations described as associated with methods 400B-C may be performed by server machine 180 (e.g., training engine 182). In some embodiments, a non-transitory storage medium stores instructions that when executed by a processing device (e.g., of predictive system 110, of server machine 180, of predictive server 112, etc.) cause the processing device to perform one or more of methods 400A-C.

For simplicity of explanation, methods 400A-C are depicted and described as a series of operations. However, operations in accordance with this disclosure can occur in various orders and/or concurrently and with other operations not presented and described herein. Furthermore, not all illustrated operations may be performed to implement methods 400A-C in accordance with the disclosed subject matter. In addition, those skilled in the art will understand and appreciate that methods 400A-C could alternatively be represented as a series of interrelated states via a state diagram or events.

Figures 4A, 4B:
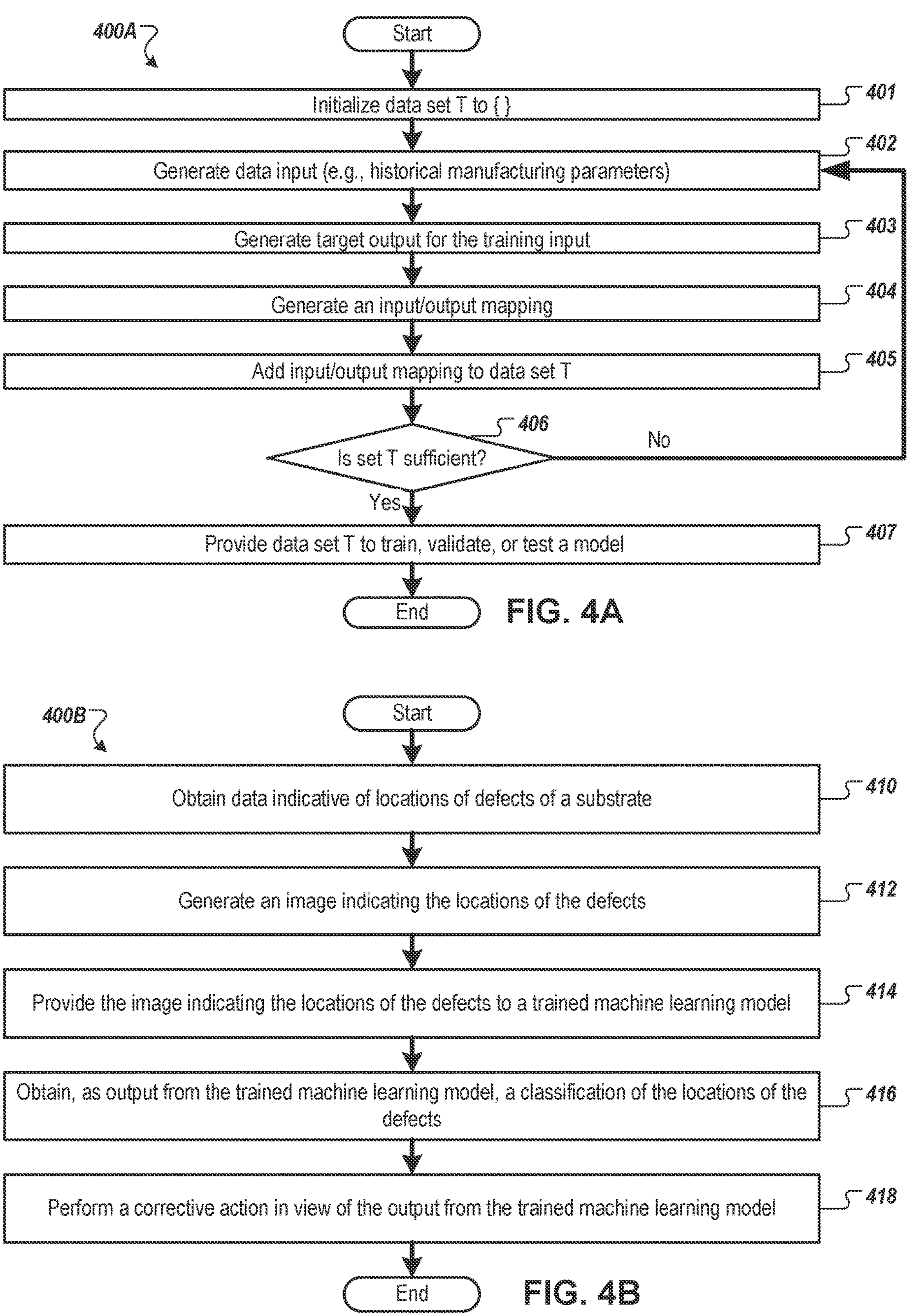
FIG. 4A is a flow diagram of a method for generating a data set for a machine learning model, according to some embodiments.
FIG. 4B is a flow diagram of a method for generating substrate defect classifications for performance of a corrective action, according to some embodiments.

FIG. 4A is a flow diagram of a method 400A for generating a data set for a model (e.g., a machine learning model) for generating output data (e.g., predictive data 168 of FIG. 1), according to some embodiments.

Referring to FIG. 4A, in some embodiments, at block 401 the processing logic implementing method 400A initializes a training set T to an empty set.

At block 402, processing logic generates first data input (e.g., first training input, first validating input) that may include sensor data, measured substrate performance data, substrate metrology data (e.g., film properties such as thickness, material composition, optical properties, roughness, and so on), substrate defect data, substrate defect location data, etc. In some embodiments, the first data input may include a first set of features for types of data and a second data input may include a second set of features for types of data (e.g., as described with respect to FIG. 3).

At block 403, processing logic generates a first target output for one or more of the data inputs (e.g., first data input). In some embodiments, the first target output includes classification of defect patterns. In some embodiments, the first target output is data indicative of a corrective actions. In some embodiments, no target output is generated (e.g., for training an unsupervised machine learning model).

At block 404, processing logic optionally generates mapping data that is indicative of an input/output mapping. The input/output mapping (or mapping data) may refer to the data input (e.g., one or more of the data inputs described herein), the target output for the data input, and an association between the data input(s) and the target output. In some embodiments (e.g., those without target output data) these operations may not be performed.

At block 405, processing logic adds the mapping data generated at block 404 to data set T, in some embodiments.

At block 406, processing logic branches based on whether data set T is sufficient for at least one of training, validating, and/or testing a model. The model may be 190 of FIG. 1. If data set T is sufficient, execution proceeds to block 407. If data set T is not sufficient, execution continues back at block 402. It should be noted that in some embodiments, the sufficiency of data set T may be determined based simply on the number of inputs, mapped in some embodiments to outputs, in the data set, while in some other implementations, the sufficiency of data set T may be determined based on one or more other criteria (e.g., a measure of diversity of the data examples, accuracy, span of the input and/or output spaces, etc.) in addition to, or instead of, the number of inputs.

At block 407, processing logic provides data set T (e.g., to server machine 180 of FIG. 1) to train, validate, and/or test a model. Processing logic may provide data set T to train, test, and/or validate model 190. In some embodiments, data set T is a training set and is provided to training engine 182 of server machine 180 to perform the training. In some embodiments, data set T is a validation set and is provided to validation engine 184 of server machine 180 to perform the validating. In some embodiments, data set T is a testing set and is provided to testing engine 186 of server machine 180 to perform the testing.

Operations of block 407 may generate a trained model. Operations of block 407 may generate model mappings between inputs and outputs. Operations of block 407 may cause adjustment to values of weights and biases between nodes of layers of a machine learning model. Operations of block 407 may case adjustment to values of adjustable parameters of a physics-based model.

FIG. 4B is a flow diagram of a method 400B for generating substrate defect classification for performance of a corrective action, according to some embodiments. In some embodiments, the model comprises a machine learning model. In some embodiments, the model comprises a physics-based model. In some embodiments, the model comprises a statistical model.

In some embodiments, a trained machine learning model is utilized to generate output data. The trained machine learning model may be configured to receive data indicative of substrate defect locations as input. The trained machine learning model may be configured to generate a classification of a pattern of defects of the substrate. One or more corrective actions may be performed in view of the pattern of defects of the substrate.

At block 410, processing logic obtains data indicative of locations of defects of a substrate. The data indicative of locations of defects of a substrate may include a list of locations of defects. The list of locations may include a coordinate representation of locations of defects. The data indicative of locations of defects may be an output of a defect inspection tool. The data indicative of locations of defects may be a KLARF file. The data indicative of locations of defects may be an image.

At block 412, processing logic generates an image indicating the locations of the defects. The image may be generated in a style that conforms to the configuration of a trained machine learning model. The image may share one or more features with images used as training data for training the trained machine learning model. The image may be of the same format and/or have similar characteristics (such as color scheme, size, etc.) as images used as training data for training the trained machine learning model.

In some embodiments, the image may be generated from data including a list of defect locations. The image may be generated in a target format or style. The image may be generated to include target characteristics or features. In some embodiments, the image may be generated from another image. The image indicating the locations of the defects may be generated from an image representation of the substrate. The image representation may be altered to improve performance of a trained machine learning model. The image representation may be altered to match characteristics of the image to images used to train the machine learning model.

Altering an image may be performed to generate an image suitable as input to a trained machine learning model. Altering the image representation of the substrate may include performing frequency domain image enhancement. Altering the image representation of the substrate may include converting the image representation of the substrate to a frequency domain. Converting the image to a frequency domain may enable spatial filtering. Converting the image to a frequency domain may enable location of edges, e.g., sharp changes in color, hue, or the like, which may correspond to images representing defects. Converting the image to a frequency domain may enable locating the boundaries of the substrate in the image representation. Altering the image representation may include applying one or more image sharpening filters in the frequency domain. Altering the image representation may include converting the filtered image representation in the frequency domain back to a spatial domain. The generated image data in the special domain may be utilized for further operations of method 400B.

At block 414, processing logic provides the image indicating the locations of the defects to a trained machine learning model. The trained machine learning model may be configured to receive image data that includes indications of defect locations of a substrate.

At block 416, processing logic obtains output from the trained machine learning model. The output includes a classification of the locations of the defects. The output may include a classification of a pattern of defects. The output may include one or more root causes associated with the locations of the defects. Root causes may be errors, deficiencies, etc., of manufacturing equipment associated with the substrate. The output may include one or more corrective actions associated with the pattern of defects. Defect patterns, root causes, and/or corrective actions may instead or additionally be correlated outside the machine learning model. In some embodiments, a second machine learning model may be used to determine a corrective actions. For example, a series of substrate defect pattern classifications may be provided to a trained machine learning model, and the trained machine learning model may generate as output one or more recommended corrective actions. Substrate defect location classification may include correlating the defect locations to a known pattern of defect locations. Patterns of defect locations, classification of substrate defect locations, etc., may include starburst, edge, crescent, scratch, streak, random, spot, etc.

At block 418, processing logic causes performance of a corrective action in view of the output from the trained machine learning model. The corrective action may be associated with a manufacturing system. The corrective action may be associated with manufacturing equipment. The corrective action may be associated with the manufacturing system and/or equipment used to generate the substrate. The corrective action may include providing an alert to a user. The corrective action may include scheduling corrective maintenance. The corrective action may include scheduling preventative maintenance. The corrective action may include updating a process recipe. The corrective action may include updating one or more equipment constants of manufacturing equipment. The corrective action may include recommending further actions, e.g., to isolate a root cause or corrective maintenance action from a plurality of root causes or actions associated with a defect pattern.

Figure 4C:
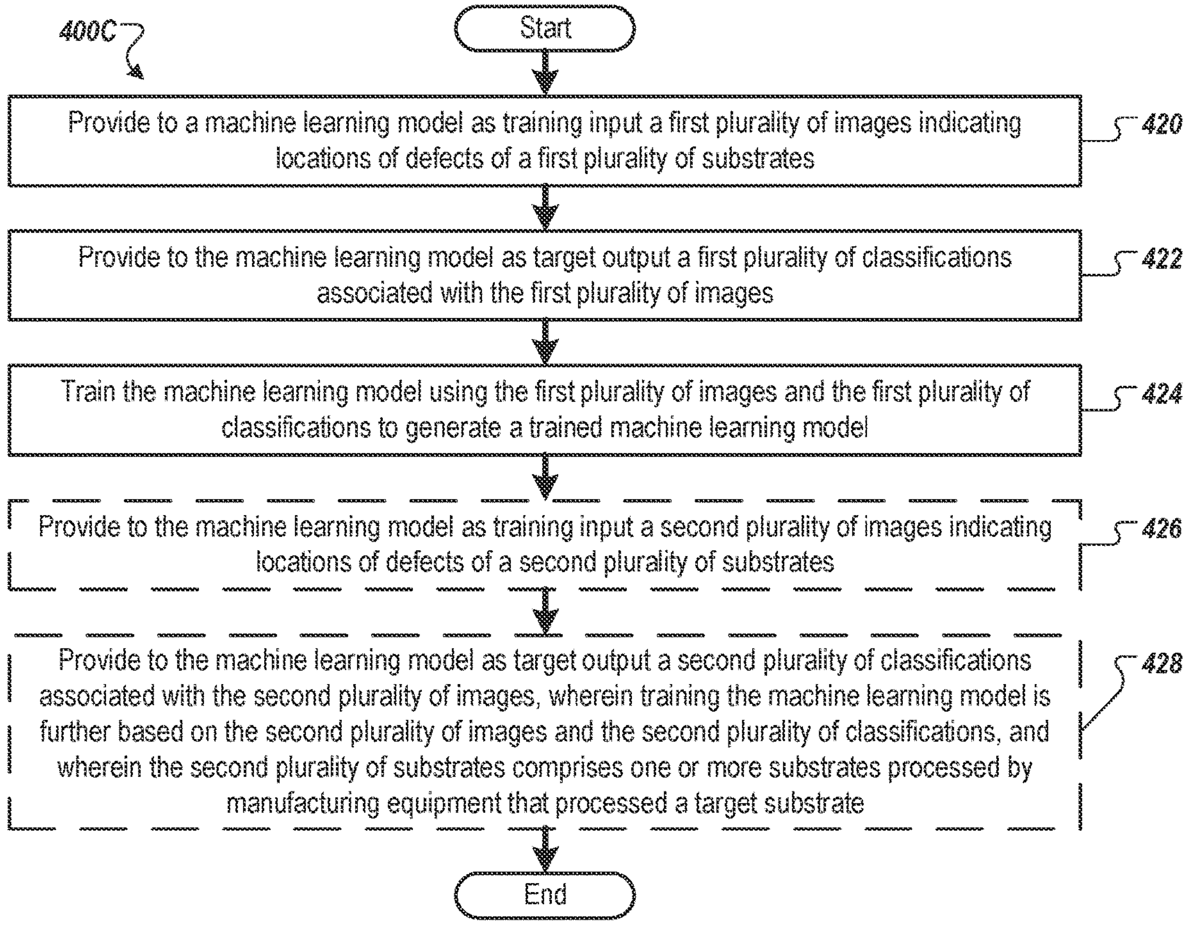
FIG. 4C is a flow diagram of a method for training a machine learning model for substrate classification, according to some embodiments.

FIG. 4C is a flow diagram of a method 400C for training a machine learning model for substrate classification, according to some embodiments. At block 420, processing logic provides, to a machine learning model, a first plurality of images. The first plurality of images is provided as training input. The first plurality of images indicates locations of defects of a first plurality of substrates. The first plurality of images may be generated based on data indicating the locations of defects of substrates.

At block 422, processing logic provides to the machine learning model, as target output, a first plurality of classifications associated with the first plurality of images. Each of the first plurality of images may be labeled with a classification of the first plurality of classifications. The first plurality of classifications may be related to defects of substrates. The classifications may be classifications of patterns of defects of the first plurality of substrates.

At block 424, processing logic trains the machine learning model. Processing logic trains the machine learning model using the first plurality of images as training input. Processing logic trains the machine learning model using the first plurality of classifications as target output. The trained machine learning model may be configured to classify defect patterns of substrates.

Blocks 426-428 are optionally performed. Blocks 426-428 are targeted towards retraining and/or multi-stage training of a machine learning model. Retraining may be performed after a machine learning model has been in use. Retraining may be performed to account for differences in a manufacturing system or equipment. Retraining may be performed to account for aging and/or degradation of components of a manufacturing system. Multi-stage training may enable training to be performed at a lower cost. Multi-stage training may include providing a sample (e.g., a large sample) of related data, and a smaller sample of more highly relevant data. For example, an initial training may be performed using readily available data that may be applicable to a target manufacturing system. An initial training may be performed using publicly available substrate data, for example. A second training may be performed using data more directly associated with a target manufacturing system. The second training may be performed using data from substrates associated with the same manufacturing system as the target substrate. The second training may be performed using data from substrates associated with manufacturing systems sharing one or more features with the target substrate.

At block 426, processing logic optionally provides, to the machine learning model as training input, a second plurality of images. The second plurality of images indicates locations of defects of a second plurality of substrates.

At block 428, processing logic provides target output to the machine learning model. The target output is a second plurality of classifications. The second plurality of classifications is associated with the second plurality of images. Training the machine learning model is based on both the first and second pluralities of images and classifications. The second plurality of substrates includes one or more substrates processed by manufacturing equipment that processed a target substrate. For example, the machine learning model may be configured to determine classifications of substrate processed by a processing tool. One or more of the second plurality of images may be of a substrate processed by the processing tool. In some embodiments, the second plurality of images may be associated with processing equipment similar to target equipment, sharing one or more features with target equipment, etc. In some embodiments, the second plurality of substrates may be similar to a target substrate, may share one or more features with a target substrate, may share one or more design parameters with a target substrate, etc.

Processing logic may cause the machine learning model to be retrained using the second plurality of images and the second plurality of classifications. Processing logic may cause the machine learning model to be trained based on the first plurality of images, the second plurality of images, the first plurality of classifications, and the second plurality of classifications.

Figure 5A:
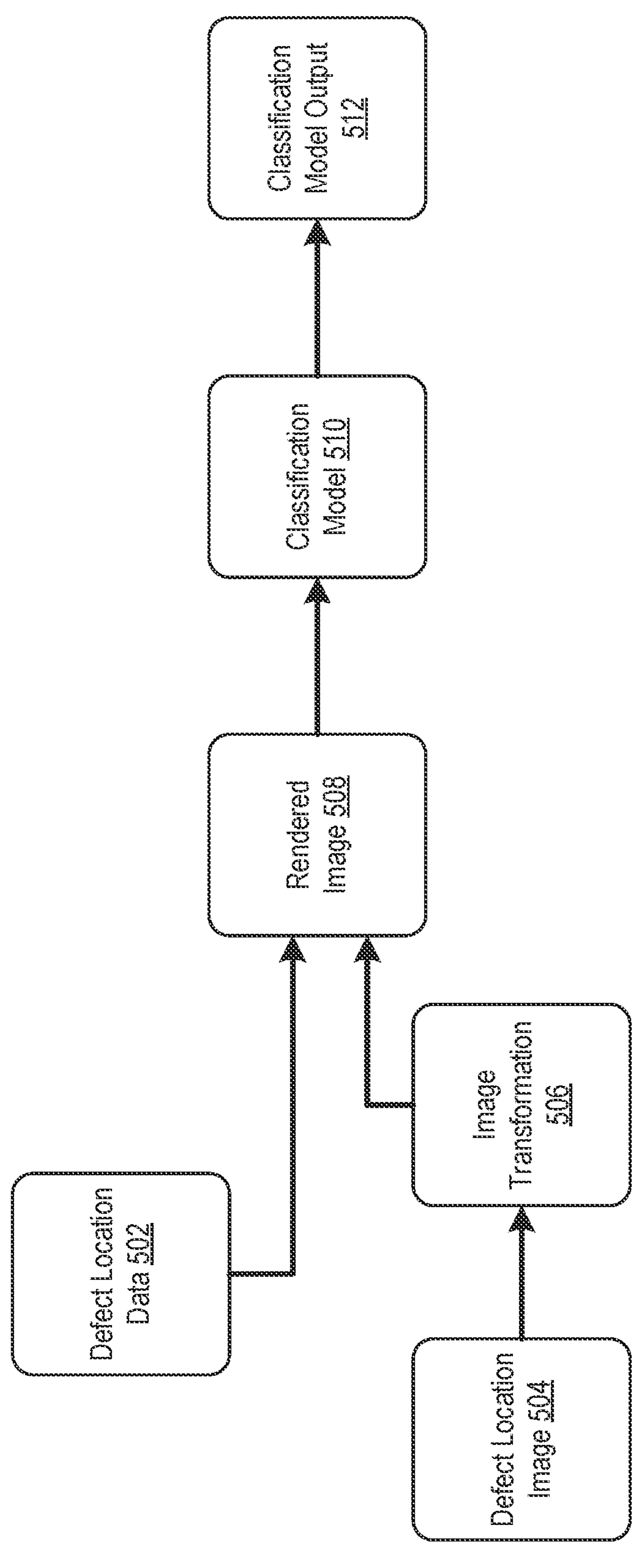
FIG. 5A is a block diagram depicting data flow in an example defect pattern classification system, according to some embodiments.

FIG. 5A is a block diagram depicting data flow in an example defect pattern classification system 500A, according to some embodiments. Pattern classification system 500A is configured to accept two streams of input for classification operations, defect location data 502 and defect location images 504. Defect location data 502 may include a list of locations of defects of a substrate. Defect location data 502 may include coordinates of defects, such as (x, y) coordinates, polar coordinates, or another system of uniquely identifying locations on a substrate. Defect location data 502 may be or include a KLARF file. Defect location data 502 may be a delimited text file, such as a CSV file. Defect location data 502 may include information generated by a substrate inspection tool. Defect location data 502 may include sensitive or proprietary data, e.g., data of this kind may be more likely to be available when analysis of defect patterns is performed within the same facility, by the same company, or the like.

Defect location image 504 may include an image that depicts locations of defects of a substrate. Defect location image 504 may be generated from a list of locations, such as a data file similar to defect location data 502. Defect location image 504 may be provided to a facility for defect pattern classification, for example as defect location image 504 may contain less sensitive or proprietary data than an analogous KLARF file of the same substrate. Defect location image

504 may not be of a standardized style, e.g., background, substrate edge, and defect colors may vary, contrast may vary, file type may vary, etc. The defect location image 504 may be provided to image transformation module 506. Image transformation 506 may generate a new image, e.g., a wafer map to be provided to the machine learning model. Image transformation 506 may be configured to maintain information related to the locations of defects of the substrate, while adjusting the style and format of the image for compatibility with a machine learning model. Image transformation 506 may perform image processing operations to adjust a provided image (e.g., defect location image 504).

Either type of input data may be used to generate a rendered image 508, e.g., a wafer map. The rendered image 508 may present locations of defects of a substrate. The rendered image 508 may be of the same style, file format, file size, etc., despite differences in source data (e.g., CSV or JPEG file types, differences between image styles of defect location image 504, etc.). Processing logic may be configured to convert image data of various styles and data including lists of defect locations to a style, format, standard, etc., for providing to a trained machine learning model. The rendered image 508 may be a map of defects of a substrate. The rendered image 508 may be a map image of defects of a substrate.

Rendered image 508 may be provided to classification model 510. Classification model 510 may be or include a trained machine learning model, such as a neural network. Classification model 510 may be configured to receive image data (e.g., a rendered wafer map) and generate as output a classification of a pattern of defects of the received image. Classifications may include, for example, a crescent, indicating an arced pattern of defects; a patch of defects; a starburst, indicating radial spokes of defects; streak or scratch, indicating an arrangement of defects along a narrow or broad line; or the like. Any pattern determined to be useful, e.g., in classification, in diagnosis of a root cause, etc., may be included in the training and operation of the machine learning model. The machine learning model may be trained using labeled training data, e.g., training data labeled by a subject matter expert. The machine learning model may generate multiple pattern indications, e.g., the two most likely patterns. The machine learning model may generate confidence values associated with output classifications. The machine learning model may output information related to defect density, e.g., by dividing the wafer into zones and reporting on the defect density of various zones.

Output of the classification model 510 is provided as classification model output 512. Classification model output 512 may be configured to be displayed as results of defect pattern classification. Classification model output 512 may include causing performance of a corrective action. Classification model output 512 may include providing an alert to a user. Classification model output 512 may include providing classification data to a library correlating classifications with root causes, corrective actions, or the like. The library may be or include a library of defect location classifications. The library may be or include a library correlating defect location pattern classifications to corrective actions and/or root causes.

Classification model output 512 may be provided to a component configured to cause performance of corrective actions, such as corrective action component 122 of FIG. 1. The corrective action component may facilitate performance of a corrective action. The corrective action may provide an alert to a user, schedule preventative maintenance, schedule corrective maintenance, adjust a process recipe, or the like.

Classification model output 512 may be provided to a component configured to present model output results, such as presentation component 115 of FIG. 1. The presentation component may present information to a user related to the output of the model. Presentation may include text, graphics, or any other presentation style for conveying results of the classification model operations to a user. For example, one or more pattern classifications may be displayed, associated confidence values may be displayed, one or more images of the substrate may be displayed, etc. An image of the substrate with defects shown may be displayed. An image of the substrate with zones or areas marked may be displayed. An image of the substrate showing zones with high and/or low defect density may be displayed. In some embodiments, data related to multiple substrates may be displayed, for example statistics of defect pattern classifications over time may be displayed.

In some embodiments, classification and display may be performed locally, e.g., the same device may receive classification data from the machine learning model, render a display, and present the display to a user. In some embodiments, various elements included in system 500A may be performed by different devices. For example, image data may be provided via a network (e.g., the internet) to a second device for data transformation and pattern classification operations. Classification data may be provided via the network to a third device for display to a user.

Figure 5B:
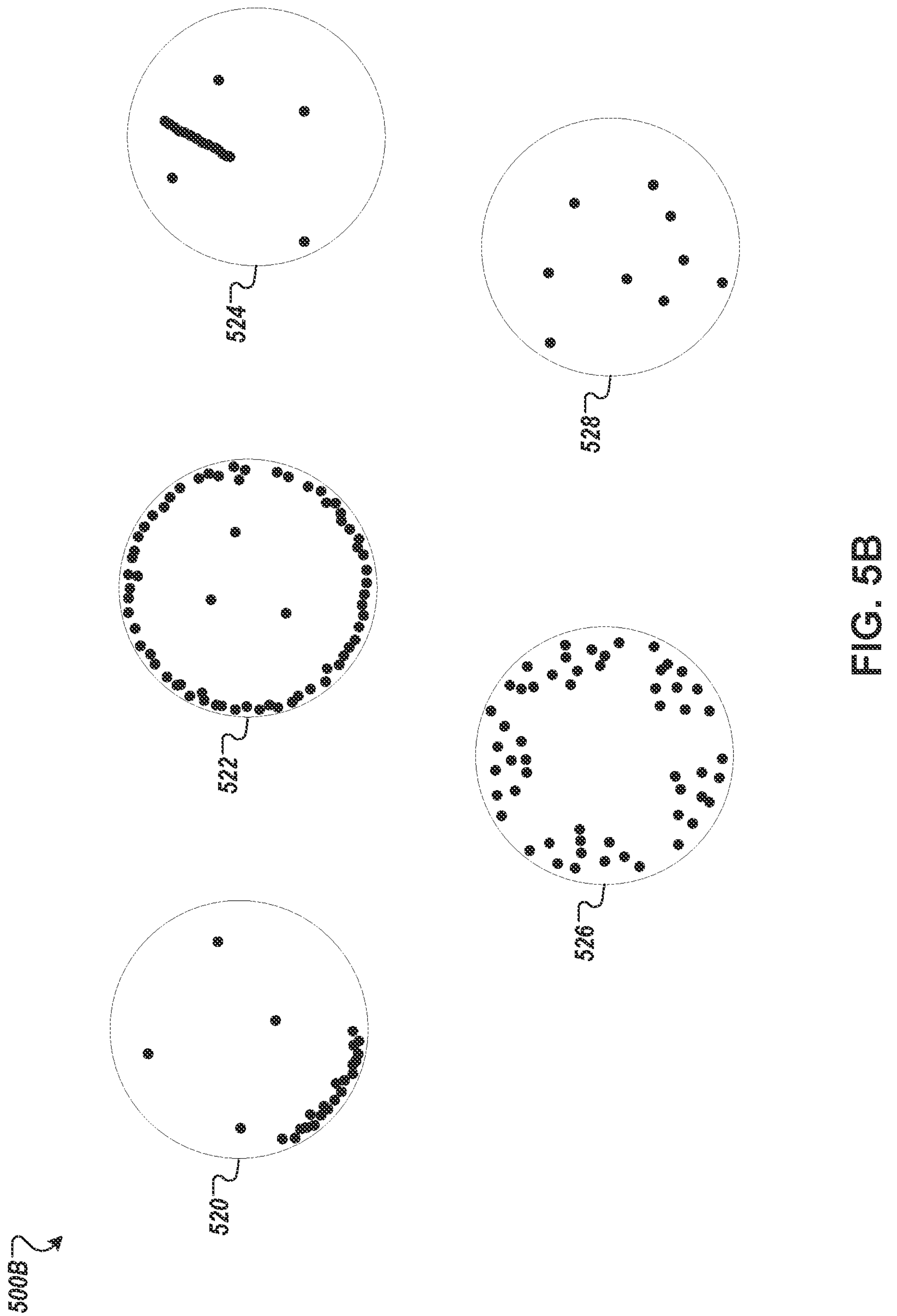
FIG. 5B is a diagram of example substrate images exhibiting defect patterns, according to some embodiments.

FIG. 5B is a diagram of example substrate images 500B exhibiting defect patterns, according to some embodiments. Substrate images 500B may be generated by inspection tools, such as defect inspection tools. Substrate images 500B may be generated based on defect location data. Substrate images 500B may be generated based on other images. Substrate images 500B may be of a format, style, or the like, to be provided as input to a trained machine learning model.

Each spot on one of example substrate images 500B may correspond to a detected defect. The images utilized according to this disclosure may vary in style from those depicted in FIG. 5B. Color, scale, size, shape, etc., of features of a substrate image may be different than depicted in FIG. 5B. Example substrate images 500B include black circles to indicate locations of defects, e.g., as reported by one or more defect inspection tools. Classifications of substrate defect patterns may be correlated to equipment malfunctions, root causes, corrective actions, or the like.

Substrate 520 includes a concentrated pattern of defects along one edge. Substrate 520 may be considered to include an arc of defects, defects in an arc pattern, etc. Substrate 520 may be classified as including a crescent pattern of defects.

Substrate 522 includes a high density of defects along the outer rim of the substrate. Substrate 522 may be classified as including an edge pattern of defects.

Substrate 524 includes a high density of defects along a narrow area. Substrate 524 may be classified as including a scratch, a scratch defect pattern, etc.

Substrate 526 includes a high density of defects that define a star-shaped pattern. Substrate 526 may be classified as including a starburst defect pattern.

Substrate 528 does not include a particularly clear pattern of defect locations. Substrate 528 may be classified as including a random pattern of defects.

Any other pattern of defects may be used as a classification. Other patterns of defects may be associated with root causes, corrective actions, etc. Other patterns of defects may include a central pattern, a ring of donut pattern, a streak, a spot, etc. Any pattern of defects observed may be included in the training and/or operation of a classification machine learning model. Any pattern of defects that has one or more associated corrective actions, one or more associated root causes, etc., may be useful to include in configured a machine learning model.

Figure 6:
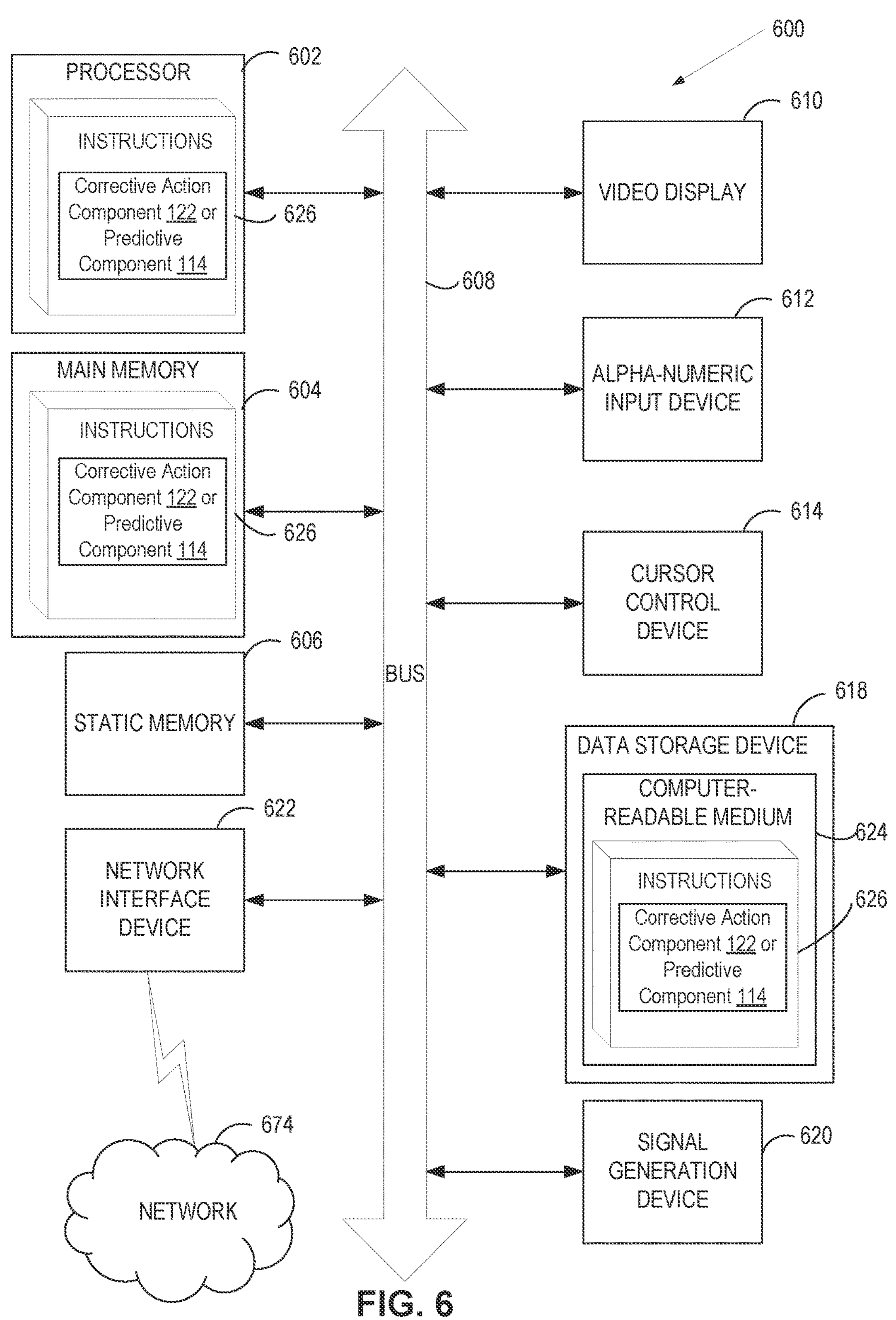
FIG. 6 is a block diagram illustrating a computer system, according to some embodiments.

FIG. 6 is a block diagram illustrating a computer system 600, according to certain embodiments. In some embodiments, computer system 600 may be connected (e.g., via a network, such as a Local Area Network (LAN), an intranet, an extranet, or the Internet) to other computer systems. Computer system 600 may operate in the capacity of a server or a client computer in a client-server environment, or as a peer computer in a peer-to-peer or distributed network environment. Computer system 600 may be provided by a personal computer (PC), a tablet PC, a Set-Top Box (STB), a Personal Digital Assistant (PDA), a cellular telephone, a web appliance, a server, a network router, switch or bridge, or any device capable of executing a set of instructions (sequential or otherwise) that specify actions to be taken by that device. Further, the term "computer" shall include any collection of computers that individually or jointly execute a set (or multiple sets) of instructions to perform any one or more of the methods described herein.

In a further aspect, the computer system 600 may include a processing device 602, a volatile memory 604 (e.g., Random Access Memory (RAM)), a non-volatile memory 606 (e.g., Read-Only Memory (ROM) or Electrically-Erasable Programmable ROM (EEPROM)), and a data storage device 618, which may communicate with each other via a bus 608.

Processing device 602 may be provided by one or more processors such as a general purpose processor (such as, for example, a Complex Instruction Set Computing (CISC) microprocessor, a Reduced Instruction Set Computing (RISC) microprocessor, a Very Long Instruction Word (VLIW) microprocessor, a microprocessor implementing other types of instruction sets, or a microprocessor implementing a combination of types of instruction sets) or a specialized processor (such as, for example, an Application Specific Integrated Circuit (ASIC), a Field Programmable Gate Array (FPGA), a Digital Signal Processor (DSP), or a network processor).

Computer system 600 may further include a network interface device 622 (e.g., coupled to network 674). Computer system 600 also may include a video display unit 610 (e.g., an LCD), an alphanumeric input device 612 (e.g., a keyboard), a cursor control device 614 (e.g., a mouse), and a signal generation device 620.

In some implementations, data storage device 618 may include a non-transitory computer-readable storage medium 624 (e.g., non-transitory machine-readable storage medium) on which may store instructions 626 encoding any one or more of the methods or functions described herein, including instructions encoding components of FIG. 1 (e.g., predictive component 114, corrective action component 122, model 190, etc.) and for implementing methods described herein.

Instructions 626 may also reside, completely or partially, within volatile memory 604 and/or within processing device 602 during execution thereof by computer system 600, hence, volatile memory 604 and processing device 602 may also constitute machine-readable storage media.

While computer-readable storage medium 624 is shown in the illustrative examples as a single medium, the term "computer-readable storage medium" shall include a single medium or multiple media (e.g., a centralized or distributed database, and/or associated caches and servers) that store the one or more sets of executable instructions. The term "computer-readable storage medium" shall also include any tangible medium that is capable of storing or encoding a set of instructions for execution by a computer that cause the computer to perform any one or more of the methods described herein. The term "computer-readable storage medium" shall include, but not be limited to, solid-state memories, optical media, and magnetic media.

The methods, components, and features described herein may be implemented by discrete hardware components or may be integrated in the functionality of other hardware components such as ASICS, FPGAs, DSPs or similar devices. In addition, the methods, components, and features may be implemented by firmware modules or functional circuitry within hardware devices. Further, the methods, components, and features may be implemented in any combination of hardware devices and computer program components, or in computer programs.

Unless specifically stated otherwise, terms such as "receiving," "performing," "providing," "obtaining," "causing," "accessing," "determining," "adding," "using," "training," "generating," "preparing," "training," "facilitating," or the like, refer to actions and processes performed or implemented by computer systems that manipulates and transforms data represented as physical (electronic) quantities within the computer system registers and memories into other data similarly represented as physical quantities within the computer system memories or registers or other such information storage, transmission or display devices. Also, the terms "first," "second," "third," "fourth," etc. as used herein are meant as labels to distinguish among different elements and may not have an ordinal meaning according to their numerical designation.

Examples described herein also relate to an apparatus for performing the methods described herein. This apparatus may be specially constructed for performing the methods described herein, or it may include a general purpose computer system selectively programmed by a computer program stored in the computer system. Such a computer program may be stored in a computer-readable tangible storage medium.

The methods and illustrative examples described herein are not inherently related to any particular computer or other apparatus. Various general purpose systems may be used in accordance with the teachings described herein, or it may prove convenient to construct more specialized apparatus to perform methods described herein and/or each of their individual functions, routines, subroutines, or operations. Examples of the structure for a variety of these systems are set forth in the description above.

The above description is intended to be illustrative, and not restrictive. Although the present disclosure has been described with references to specific illustrative examples and implementations, it will be recognized that the present disclosure is not limited to the examples and implementations described. The scope of the disclosure should be determined with reference to the following claims, along with the full scope of equivalents to which the claims are entitled.

What is claimed is:

1. A method, comprising:

obtaining, by a processing device, first data indicative of locations of defects of a first substrate comprising an inspection image of the first substrate;

generating a first image indicating the locations of the defects of the first substrate, wherein generating the first image comprises:

converting the inspection image to a frequency domain representation, applying one or more image sharpening filters in the frequency domain, and converting the frequency domain representation to a spatial domain to generate the first image;

providing the first image indicating the locations of the defects of the first substrate to a trained machine learning model;

obtaining, as first output from the trained machine learning model, a classification of the locations of the defects of the first substrate;

obtaining a list of defect locations of a second substrate;

generating a second image indicating locations of the defects of the second substrate based on the list of defect locations;

obtaining, as second output from the trained machine learning model, a classification of the locations of the defects of the second substrate; and performing a first corrective action in view of the first output from the trained machine learning model and a second corrective action in view of the second output from the trained machine learning model.

2. The method of claim 1, wherein the first data indicative of the locations of the defects of the first substrate comprises a coordinate representation of the locations of the defects.

3. The method of claim 1, wherein the first data indicative of the locations of the defects of the first substrate comprises an image representation of the first substrate.

4. The method of claim 1, further comprising obtaining, from a library of defect location classifications, data indicative of the first corrective action responsive to receiving the classification of the locations of the defects from the trained machine learning model.

5. The method of claim 1, wherein the first corrective action comprises at least one of:

providing an alert to a user;

scheduling corrective maintenance;

scheduling preventative maintenance; or updating a process recipe.

6. The method of claim 1, further comprising:

providing to a machine learning model as training input, a first plurality of images indicating locations of defects of a first plurality of substrates;

providing to the machine learning model as target output, a first plurality of classifications associated with the first plurality of images; and training the machine learning model using the first plurality of images and the first plurality of classifications to generate the trained machine learning model.

7. The method of claim 6, further comprising:

providing to the machine learning model as training input, a second plurality of images indicating locations of defects of a second plurality of substrates; and providing to the machine learning model as target output, a second plurality of classifications associated with the second plurality of images, wherein training the machine learning model is further based on the second plurality of images and the second plurality of classifications, and wherein the second plurality of substrates comprises one or more substrates processed by manufacturing equipment that processed the first substrate.

8. The method of claim 1, wherein the classification comprises one of: starburst; edge; crescent; scratch; or streak.

9. The method of claim 1, further comprising:

obtaining, by the processing device, second data indicative of locations of defects of a second substrate;

generating a second image indicating the locations of the defects of the second substrate;

providing the second image indicating the locations of the defects of the second substrate to the trained machine learning model; and obtaining, as second output from the trained machine learning model, a classification of the locations of the defects of the second substrate, wherein:

the first data indicative of locations of defects of the first substrate comprises an image, the image indicates defect locations of the first substrate, and the second data indicative of locations of the second substrate comprises a list of locations of defects of the second substrate.

10. A system, comprising memory and a processing device coupled to the memory, wherein the processing device is to:

obtain first data indicative of locations of defects of a first substrate comprising an inspection image of the first substrate;

generate a first image indicating the locations of the defects of the first substrate, wherein generating the first image comprises:

converting the inspection image to a frequency domain representation, applying one or more image sharpening filters in the frequency domain, and converting the frequency domain representation to a spatial domain to generate the first image;

provide the first image indicating the locations of the defects of the first substrate to a trained machine learning model;

obtain, as first output from the trained machine learning model, a classification of the locations of the defects of the first substrate;

obtain a list of defect locations of a second substrate;

generate a second image indicating locations of the defects of the second substrate based on the list of defect locations;

obtain, as second output from the trained machine learning model, a classification of the locations of the defects of the second substrate; and perform a first corrective action in view of the first output from the trained machine learning model and a second corrective action in view of the second output from the trained machine learning model.

11. The system of claim 10, wherein the processing device is further to:

obtain second data indicative of locations of defects of a second substrate;

generate a second image indicating the locations of the defects of the second substrate;

provide the second image indicating the locations of the defects of the second substrate to the trained machine learning model; and obtain, as second output from the trained machine learning model, a classification of the locations of the defects of the second substrate, wherein:

performance of the first corrective action and second corrective action is performed in further view of the second output from the trained machine learning model, the first data indicative of locations of defects of a first substrate comprises an image, wherein the image indicates defect locations of the first substrate, and the second data indicative of locations of a second substrate comprises a list of locations of defects of the second substrate.

12. The system of claim 10, wherein the processing device is further to obtain, from a library of defect location classifications, data indicative of the first corrective action responsive to receiving the classification of the locations of the defects from the trained machine learning model.

13. The system of claim 10, wherein the first corrective action comprises at least one of:

providing an alert to a user;

scheduling corrective maintenance;

scheduling preventative maintenance; or updating a process recipe.

14. A non-transitory machine-readable storage medium storing instruction which, when executed, cause a processing device to perform operations comprising:

obtaining, by a processing device, data indicative of locations of defects of a substrate;

generating an image indicating the locations of the defects;

providing the image indicating the locations of the defects to a trained machine learning model;

obtaining, as output from the trained machine learning model, a classification of the locations of the defects; and performing a corrective action in view of the output from the trained machine learning model.

15. The non-transitory machine-readable storage medium of claim 14, wherein the data indicative of the locations of the defects of the substrate comprises an image representation of the substrate.

16. The non-transitory machine-readable storage medium of claim 14, further comprising obtaining, from a library of defect location classifications, data indicative of the corrective action responsive to receiving the classification of the locations of the defects from the trained machine learning model.

17. The non-transitory machine-readable storage medium of claim 14, wherein the corrective action comprises at least one of:

providing an alert to a user;

scheduling corrective maintenance;

scheduling preventative maintenance; or updating a process recipe.

18. The non-transitory machine-readable storage medium of claim 14, wherein the classification comprises one of: starburst; edge; crescent; scratch; or streak.

* * * * *